(12) United States Patent
Kaneko

(10) Patent No.: US 8,497,332 B2
(45) Date of Patent: Jul. 30, 2013

(54) α-ALLYLOXYMETHYLACRYLIC ACID-BASED COPOLYMER, RESIN COMPOSITIONS, AND USE THEREOF

(75) Inventor: Tomomasa Kaneko, Osaka (JP)

(73) Assignee: Nippon Shokubai Co., Ltd., Osaka (JP)

(*) Notice: Subject to any disclaimer, the term of this patent is extended or adjusted under 35 U.S.C. 154(b) by 68 days.

(21) Appl. No.: 13/142,142

(22) PCT Filed: Dec. 28, 2009

(86) PCT No.: PCT/JP2009/071819
§ 371 (c)(1),
(2), (4) Date: Jun. 24, 2011

(87) PCT Pub. No.: WO2010/074289
PCT Pub. Date: Jul. 1, 2010

(65) Prior Publication Data
US 2011/0263805 A1      Oct. 27, 2011

(30) Foreign Application Priority Data

Dec. 26, 2008 (JP) ................. 2008-331731
Dec. 26, 2008 (JP) ................. 2008-331752
Dec. 26, 2008 (JP) ................. 2008-331812
Dec. 26, 2008 (JP) ................. 2008-333228
Sep. 28, 2009 (JP) ................. 2009-223280

(51) Int. Cl.
*C08F 220/06* (2006.01)
*C08F 220/28* (2006.01)

(52) U.S. Cl.
USPC ............ 526/224; 526/317.1; 526/320

(58) Field of Classification Search
USPC ................. 526/224, 317.1, 320
See application file for complete search history.

(56) References Cited

U.S. PATENT DOCUMENTS
2007/0212651 A1    9/2007   Huang et al.

FOREIGN PATENT DOCUMENTS
| JP | 2003-201316 A | 7/2003 |
| JP | 2005-234385 A | 9/2005 |
| JP | 2006-161035 A | 6/2006 |
| JP | 2007-316598 A | 12/2007 |

OTHER PUBLICATIONS
Thompson et al. Macromolecules 1992, 25, 6455-6459.*

(Continued)

*Primary Examiner* — Vu A Nguyen
(74) *Attorney, Agent, or Firm* — Novak Druce Connolly Bove + Quigg LLP

(57) ABSTRACT

The present invention provides: resins which can be used for various applications such as radical curable resin compositions, colorant-dispersed compositions, and photosensitive resin compositions; resin compositions; and means for producing the resins. Specifically, the present invention provides an α-allyloxymethylacrylic copolymer having in its main chain a structural unit represented by formula (1):

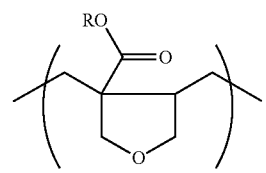

(1)

wherein R is a hydrogen atom or a C1-C30 organic group.

12 Claims, 2 Drawing Sheets

OTHER PUBLICATIONS

Urishisaki et al., Cyclopolymerization. 25. Five-Membered Ring Formation through Head-to-Head and Tail-to-Tail Additions in Radical and Anionic Polymerizations of α-(Allyloxymethyl)acrylates; Macromolecules 1999, vol. 32, pp. 322-327.

Tsuda et al., Cyclopolymerization of ether dimers of α-(hydroxymethyl)acrylic acid and its alkyl esters: substituent effect on cyclization efficiency and microstructures; Polymer, 1994, vol. 35, pp. 3317-3328.

Thompson et al., Unusually Facile Cyclopolymerization of a New Allyl Ether Substituted Acrylate and Confirmation of Repeat Unit Structure by INADEQUATE NMR; Macromolecules, 1992, vol. 25, pp. 6455-6459.

* cited by examiner

α-ALLYLOXYMETHYLACRYLIC ACID-BASED COPOLYMER, RESIN COMPOSITIONS, AND USE THEREOF

CROSS REFERENCE TO RELATED APPLICATIONS

This application is a National Phase filing under 35 U.S.C. §371 of PCT/JP2009/071819 filed on Dec. 28, 2009; and this application claims priority to Application No. 2008-331812 filed in Japan on Dec. 26, 2008 under 35 U.S.C. §119, Application No. 2008-331752 filed in Japan on Dec. 26, 2008 under 35 U.S.C. §119, Application No. 2008-331731 filed in Japan on Dec. 26, 2008 under 35 U.S.C. §119, Application No. 2008-333228 filed in Japan on Dec. 26, 2008 under 35 U.S.C. §119 and Application No. 2009-223280 filed in Japan on Sep. 28, 2009 under 35 U.S.C. §119; the entire contents of all are hereby incorporated by reference.

TECHNICAL FIELD

The present invention relates to an α-allyloxymethylacrylic copolymer, a resin composition comprising the copolymer, use thereof, and a method for producing the polymer. The present invention specifically relates to an α-allyloxymethylacrylic copolymer which can be suitably used for various applications such as radical-curable resin compositions, colorant-dispersed compositions, and photosensitive resin compositions, these resin compositions, and a method for producing the polymer.

BACKGROUND ART

Resins (polymers) having a cyclic structure in the main chain are excellent in durability, especially heat resistance, and thus they are useful materials used in various fields such as engineering plastics, optical materials, and resist materials. Particularly, in recent years, various resin compositions such as radical curable resin compositions, colorant-dispersed compositions, and photosensitive resin compositions are produced from the above resins. Applications of these resin compositions for coating materials, high-performance inks, and resist materials have been considered.

Curable resin compositions are used in various industrial fields. In particular, a radical curable resin composition comprising a radical polymerizable monomer and a binder resin is excellent in characteristics such as a curing rate, durability of a chemical bond to be formed, and cost efficiency. Thus, it is used for a wide range of applications, such as coating materials, adhesives, sealants, pressure-sensitive adhesives, paints, inks, resists, dental materials, lenses, and molding materials.

On the other hand, alkali-soluble resins are used as materials in various industrial fields, from materials for civil engineering and construction to materials for electronic information. One main application thereof is an alkali-developable resist.

An alkali-developable resist (hereinafter, also referred to simply as a resist) is generally a resin composition comprising an alkali-soluble resin, a curable component, a photo initiator for curing the curable component, and a solvent. This resist is an industrial material indispensable and useful to photolithography, and examples thereof include various resists according to their applications, such as solder resists, etching resists, interlayer insulating materials, plating resists, and resists for color filters. Among these, resists for color filters are ones of the resists which are required to have the highest and various characteristics.

A color filter is a main component constituting a color liquid crystal display panel and a color image pick-up device. It has a fine colored layer for separating colors, and such a structure enables a liquid crystal panel and an image pick-up device to display colored images. One main method for forming a colored layer is photolithography using an alkali-developable photosensitive resin composition (hereinafter, also referred to as a color resist) containing an alkali-soluble resin, a radical polymerizable monomer, a photo initiator, a colorant as a coloring component, and a dispersant for the colorant. Production processes of a color filter or a liquid crystal display panel include many steps where heat higher than 200° C. is applied. Thus, the colored layer of a color filter is required to be resistant to such thermal history. Further, recently, color filters are much more required to have higher color purity for improved display quality and imaging quality, and the colorant concentration in the color resist tends to be high. However, high colorant concentration in the color resist causes reduction in colorant-dispersion stability and image-forming properties of the color resist (e.g. coatability, curability, development residues, developing time, edge shape, and resolubility after drying). If the quantity of a dispersant increases for ensuring the dispersion stability of the colorant, the quantities of the radical polymerizable monomer and the alkali-soluble resin are to be reduced, and thus the image-forming properties of the color resist tend to be deteriorated and heat resistance (e.g. resistance to heat decomposition and heat-resistant transparency) tends to greatly decrease.

In alkali-developable resists such as a resist for color filters, the alkali-soluble resin is a component which imparts film formability and solubility into a developing agent to a resist, that is, which makes resists resist. It is also called a binder resin for its role. Further, the alkali-soluble resin is a component which controls various properties such as curability, adhesiveness, heat resistance, resolubility after drying, and heat resistance. Thus, in order to solve problems in resists, an appropriate binder resin is used for solving the problems in many cases.

Many methods for improving a binder resin are proposed in order to solve the aforementioned problems in the resist for color filters. One example thereof is a method in which a resin which has a cyclic structure in its main chain and which is known to have excellent durability, especially heat resistance is used as a binder resin (for example, see Patent Document 1 and Patent Document 2). In particular, the resin disclosed in Patent Document 1 is considered to provide a color resist excellent in properties such as curability, solubility in a solvent, developability, dispersibility, and adhesiveness, and to be effective in solving the aforementioned problems.

As mentioned above, a resin having a cyclic structure in its main chain is excellent in durability and heat resistance, and is used for various applications. Such a resin may be produced by coupling monomers each having a cyclic structure with each other by a polycondensation mechanism or an addition polymerization mechanism, and thereby incorporating the cyclic structures of the monomers into the main chain. Examples of a resin having a cyclic structure in its main chain produced by the polycondensation mechanism include polycarbonates, polyimides, and polyphenylene sulfides. These resins have very high heat resistance and are mainly used for engineering plastics. However, these resins are produced under very hard conditions such as those with high temperature and high pressure, or those generating hydrochloric acid.

Thus, it is disadvantageously difficult to control performance suitable for its application and to impart various characteristics.

In contrast, the addition polymerization mechanism allows easy control of the molecular weight and copolymerization with various vinyl monomers under mild conditions. Thus, this mechanism enables easy control of performance suitable for its application and easy impartation of various characteristics in addition to heat resistance. Therefore, the mechanism is used for synthesizing resins used for applications requiring high and various characteristics, such as optical materials and resist materials. Examples of a resin having a cyclic structure in its main chain produced by the addition polymerization mechanism include cycloolefin polymers synthesized by coordination polymerization of cycloolefins and maleimide-based polymers synthesized by radical polymerization of N-substituted maleimides.

On the other hand, the resin having a cyclic structure in its main chain may be synthesized by addition-polymerizing and simultaneously cyclizing monomers each having no cyclic structure. Examples of such a method include a method in which 1,6-dienes are polymerized by a radical polymerization mechanism to form a resin having a 5- or 6-membered ring in its main chain (for example, see Non-Patent Document 1, Non-Patent Document 2, and Non-Patent Document 3). The cyclic structure is formed upon polymerization in such a method. Thus, the method provides a novel synthesizing method different from the aforementioned polycondensation and addition polymerization in which monomers each having a cyclic structure are preliminarily prepared.

Patent Document 1: JP 2006-161035 A
Patent Document 2: JP 2003-201316 A
Non-Patent Document 1: Takashi Tsuda, and one other, "POLYMER" (Holland), 1994, vol. 35, pp. 3317-3328
Non-Patent Document 2: Rovert D. Thompson, and two others, "Macromolecules" (United States), 1992, vol. 25, pp. 6455-6459
Non-Patent Document 3: Michio Urushisaki, and four others, "Macromolecules" (United States), 1999, vol. 32, pp. 322-327

SUMMARY OF THE INVENTION

As mentioned above, the resins having a cyclic structure in its main chain used in various compositions, the resin compositions thereof, and the methods for producing the respective resins are studied. Each has a problem, and each can be further improved.

A radical curable resin composition prepared using a tetrahydrofurfuryl group-containing radical polymerizable monomer or a binder resin having a tetrahydrofurfuryl group in its branch are excellent in curability in the air (oxygen-trapping ability) and good in adhesiveness and transparency; however, they can be improved in heat resistance.

With respect to the resins for colorant-dispersed compositions, resins disclosed in Non-Patent Document 1 and Patent Document 1 tend to cause an abnormal increase in the molecular weight upon polymerization (very wide dispersion of molecular weight distribution) or gelation, and are disadvantageous in production stability and quality control. Further, they can be improved in the balance of dispersibility and other characteristics at high levels.

With respect to the resins for photosensitive resin compositions, a binder resin and a color resist disclosed in Patent Document 2 are excellent in heat resistance and image-forming properties, but insufficiently achieve a high colorant concentration. A binder resin and a color resist disclosed in Patent Document 1 have improved colorant-dispersion stability and image-forming properties for achieving a high colorant concentration; however, they can be further improved. In addition, production of the binder resin tends to cause an abnormal increase in the molecular weight and gelation, and thus is disadvantageous in production stability and quality control.

In the method of addition-polymerizing and simultaneously cyclizing monomers having no cyclic structure, a structural unit derived from a 1,6-diene monomer polymerized without cyclization (hereinafter, also referred to as an "uncyclized unit") is generated. A double bond in the uncyclized unit may be the origin of branching or of cross-linking, and an abnormal increase in the molecular weight (very wide dispersion of molecular weight distribution) or gelation may be caused in some cases. Such tendency is particularly observed under industrially and economically advantageous conditions such as those for increasing the conversion ratio of monomers and those for increasing the polymerization concentration. This tendency greatly inhibits commercialization of the resin having a cyclic structure in its main chain whose material is a 1,6-diene monomer.

The present invention is devised under such situation, and aims to provide resins which are suitable for various applications such as radical curable resin compositions, colorant-dispersed compositions, and photosensitive resin compositions, resin compositions, and means for producing the respective resins.

The present invention particularly aims to provide a binder resin for a radical-curable composition excellent in adhesiveness and transparency and highly excellent in heat resistance and a radical-curable composition comprising the binder resin.

The present invention also provides a resin for a colorant-dispersed composition which achieves dispersibility and other characteristics such as adhesiveness and curability in a balanced manner at high levels and a colorant-dispersed composition comprising the resin.

The present invention further provides a novel alkali-soluble resin having a cyclic structure in its main chain with high heat resistance, excellent colorant-dispersion stability, and excellent image-forming properties, and a photosensitive resin composition comprising the novel resin as a binder resin. In addition, the present invention provides a color filter produced using the photosensitive resin composition and a liquid crystal display panel provided with the color filter.

The present inventor has studied a polymer having a structural unit represented by formula (1) shown below in its main chain. As a result, he has found that the structure having a tetrahydrofuran ring (THF ring) in its main chain exhibits curability in the air (oxygen-trapping ability) and good adhesiveness and transparency and the polymer is excellent in heat resistance, and that the polymer can be suitably used for a radical curable resin composition for various applications. The present inventor has found that the polymer is highly excellent in colorant dispersibility and further especially excellent in adhesiveness and curability, and that the polymer can be suitably used for a high-performance colorant-dispersed composition for various inks, paints, and the like. The present inventor has furthermore found that the polymer is highly excellent in heat resistance and colorant dispersibility, as well as excellent in image-forming properties, and that the polymer can be suitably used for a photosensitive resin composition.

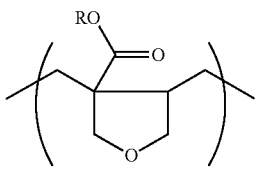

(1)

The present inventor has further studied a method for producing a polymer having a cyclic structure in its main chain by cyclopolymerizing 1,6-diene monomers, resulting in having found that a chain transfer agent which is generally used for controlling a molecular weight exerts a specific effect of preventing the polymer from branching in cyclopolymerization of specific 1,6-dienes. In other words, the present inventor has found that the prevention of branching causes prevention of cross-linking, and a chain transfer agent serves as what is called a cross-linking inhibitor. Thus, this effect leads to a narrow molecular weight distribution of a polymer to be produced and production of a polymer without gelation under industrially and economically advantageous conditions. It is not known that a chain transfer agent not only controls a molecular weight by the chain transfer action upon polymerization but also prevents branching, and cross-linking and gelation which accompany the branching.

In other words, the aforementioned effects appear only in polymerizing specific 1,6-diene monomers, and this usage of a chain transfer agent is different from the common usage thereof for controlling a molecular weight; the effects are new findings that the present inventor has found.

Further, the prevention of branching leads to an increase in heat resistance of a polymer to be produced. As a result, the present inventor has found that the production method of the present invention can prevent branching of a polymer even under industrially advantageous conditions, such as those with a high conversion ratio and polymerization with high-concentration monomer components, and thus can provide a polymer having a cyclic structure in its main chain and highly excellent heat resistance.

The present invention relates to an α-allyloxymethylacrylic copolymer having in its main chain a structural unit represented by formula (1):

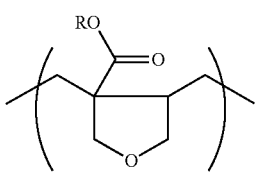

(1)

wherein R is a hydrogen atom or a C1-C30 organic group.

The present invention also relates to a resin composition comprising the α-allyloxymethylacrylic copolymer, wherein the resin composition is intended to be used for at least one application selected from the group consisting of applications requiring photosensitivity, applications requiring colorant dispersibility, and applications requiring radical curability.

The present invention further relates to a method for producing an α-allyloxymethylacrylic copolymer having in its main chain a structural unit represented by formula (1):

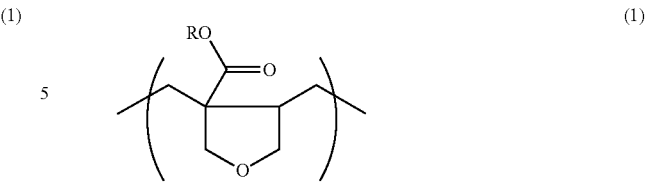

(1)

wherein R is a hydrogen atom or a C1-C30 organic group.

The method comprises polymerizing monomer components including an α-allyloxymethylacrylic monomer represented by formula (2):

(2)

wherein R is a hydrogen atom or a C1-C30 organic group.

The following will describe the present invention in detail.

The α-allyloxymethylacrylic copolymer of the present invention is a copolymer having a structural unit represented by formula (1) in its main chain (hereinafter, also referred to as an "AMA copolymer (b)"). A resin composition produced using such a copolymer as a resin having a cyclic structure in its main chain can be suitably used for various applications.

Here, R in formula (1) is the same as that in the below-mentioned formula (2).

The α-allyloxymethylacrylic copolymer is preferably obtainable by a production method comprising polymerizing monomer components including a monomer represented by formula (2):

(2)

wherein R is a hydrogen atom or a C1-C30 organic group.

The α-allyloxymethylacrylic monomer (hereinafter, also referred to as an "AMA monomer (a)") represented by formula (2) may include one species or multiple species thereof. The monomer components include the AMA monomer (a) and other radical polymerizable monomers.

The following will describe the AMA monomer (a) in detail.

The AMA monomer (a) generates the structural unit represented by formula (1) at a high rate upon polymerization. That is, this monomer is less likely to cause polymer branches, and thus is less likely to cause abnormally high molecular weight and gelation than other 1,6-diene monomers.

In formula (2) which represents the structure of the AMA monomer (a), R is a hydrogen atom or a C1-C30 organic group. In the below-mentioned method for producing an α-allyloxymethylacrylic copolymer of the present invention, the effect of preventing polymer branching exerted by a chain transfer agent is presumably due to the allyl ether group in the AMA monomer (a); thus, the effect is sufficiently achieved even if R is changed. Further, the expression of the characteristics of the α-allyloxymethylacrylic copolymer to be produced is due to methylene groups on the respective sides of the THF ring and the THF ring in the main chain in the structural unit represented by formula (1); thus, R may be appropriately selected depending on the object and the application.

As mentioned above, no problems may occur as long as R in formula (2) is a hydrogen atom or a C1-C30 organic group. These groups do not inhibit working of the copolymer, the resin composition, and the production methods thereof, and the effects of the present invention are presumably achieved.

Specific examples of the C1-C30 organic group include: saturated open-chain hydrocarbon groups such as methyl, ethyl, propyl, butyl, amyl, hexyloctyl, 2-ethylhexyl, lauryl, and stearyl; alkoxy-substituted saturated open-chain hydrocarbon groups in which a part of the hydrogen atoms in a saturated open-chain hydrocarbon group is replaced by an alkoxy group, such as methoxyethyl and methoxyethoxyethyl; hydroxy-substituted saturated open-chain hydrocarbon groups in which a part of the hydrogen atoms in a saturated open-chain hydrocarbon group is replaced by a hydroxy group, such as hydroxyethyl, hydroxypropyl, and hydroxybutyl; halogen-substituted saturated open-chain hydrocarbon groups in which a part of the hydrogen atoms in a saturated open-chain hydrocarbon group is replaced by a halogen, such as fluoroethyl, difluoroethyl, chloroethyl, dichloroethyl, bromoethyl, and dibromoethyl;

Unsaturated open-chain hydrocarbon groups, such as vinyl, allyl, methallyl, crotyl, and propargyl, and unsaturated open-chain hydrocarbon groups in which a part of the hydrogen atoms is replaced by an alkoxy group, a hydroxy group, or a halogen; alicyclic hydrocarbon groups such as cyclopentyl, cyclohexyl, 4-methylcyclohexyl, 4-t-butylcyclohexyl, tricyclodecanyl, isobornyl, adamantyl, and dicyclopentadienyl, and alicyclic hydrocarbon groups in which a part of the hydrogen atoms is replaced by an alkoxy group, a hydroxy group, or a halogen; and aromatic hydrocarbon groups such as phenyl, methylphenyl, dimethylphenyl, trimethylphenyl, 4-t-butylphenyl, and benzyl, and aromatic hydrocarbon groups in which a part of the hydrogen atoms is replaced by an alkoxy group, a hydroxy group, or a halogen. These organic groups (organic residues) can be suitably used. In addition, these organic groups may be further substituted. The AMA monomers (a) among the monomer components may have the same R, or may have different two or more Rs. In other words, the AMA copolymer (b) may include structural units derived from multiple AMA monomers (a) each having a different R.

As mentioned here, in one of the preferable embodiments of the present invention, R in the formula (2) is a hydrogen atom, a saturated open-chain hydrocarbon group, an alkoxy-substituted saturated open-chain hydrocarbon group, a hydroxy-substituted saturated open-chain hydrocarbon group, a halogen-substituted saturated open-chain hydrocarbon group, an unsaturated open-chain hydrocarbon group, an alkoxy-substituted unsaturated open-chain hydrocarbon group, a hydroxy-substituted unsaturated open-chain hydrocarbon group, a halogen-substituted unsaturated open-chain hydrocarbon group, an alicyclic hydrocarbon group, an alkoxy-substituted alicyclic hydrocarbon group, a hydroxy-substituted alicyclic hydrocarbon group, a halogen-substituted alicyclic hydrocarbon group, an aromatic hydrocarbon group, an alkoxy-substituted aromatic hydrocarbon group, a hydroxy-substituted aromatic hydrocarbon group, or a halogen-substituted aromatic hydrocarbon group.

The following will specifically describe the AMA copolymer (b) which is obtainable by radical polymerizing the monomer components including the aforementioned AMA monomer (a).

The AMA copolymer (b) includes the structural unit represented by formula (1) in its main chain. Since the copolymer has a cyclic structure in its main chain, it is high in heat resistance. In general, most resins having a cyclic structure in the main chain are high in heat resistance, but are poor in flexibility. In contrast, the repeating unit having a THF ring represented by formula (1) has methylene groups on the respective sides of the THF ring, and thus the copolymer to be produced is excellent in flexibility. In the AMA copolymer (b), R in formula (1) may be different from a structural unit to another, or may be the same among the structural units.

A tetrahydrofurfuryl group which is a THF ring-containing functional group is known to trap oxygen by a mechanism represented by formula (3).

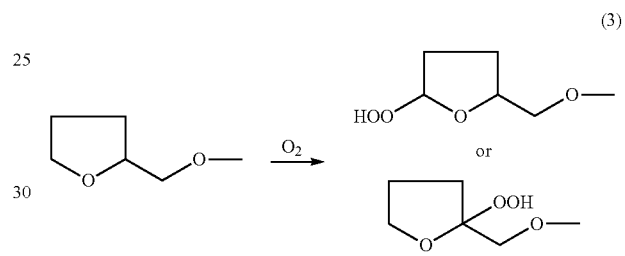

(3)

The α-allyloxymethylacrylic copolymer of the present invention also presumably exerts the oxygen-trapping ability as shown in the reaction represented by formula (4):

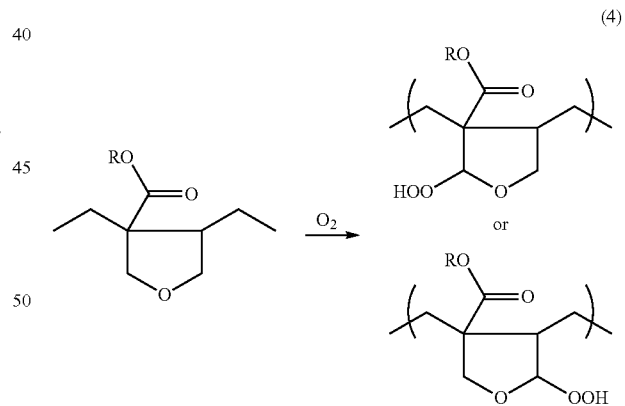

(4)

wherein R is a hydrogen atom or a C1-C30 organic group. In the case that the AMA copolymer (b) is used for compositions such as radical curable resin compositions, for example, the copolymer presumably reduces radical curing inhibition due to oxygen upon radical curing by heat or active energy rays. From such a viewpoint, the AMA copolymer (b) of the present invention can be suitably used for radical curable resin compositions, and can improve surface curability and thin-film curability. Since the copolymer has an oxygen-trapping ability, it can also be suitably used for applications such as oxygen-absorbing films and protecting materials for organic electroluminescent elements.

The THF ring serves as what is called a Lewis base (a compound which donates a lone electron pair). Thus, in the case of bonding a resin composition comprising the AMA copolymer (b) and another material, for example, the THF ring and the functional group on the surface of the other material are likely to interact with each other, resulting in good adhesiveness. From such a viewpoint, the Copolymer can be suitably used for various resin compositions which are closely attached to a substrate or the like.

Since the AMA copolymer (b) has a THF ring which is free from a nitrogen (N) atom, it is excellent in transparency. Thus, the copolymer can be suitably used for optical materials such as lenses and color filters.

The AMA copolymer (b) is excellent in colorant-dispersion stability. This is presumably because the THF ring which is a Lewis base and the functional group of the surface of a colorant (e.g. pigments and dyes) or a colorant dispersant interact with each other. Thus, the AMA copolymer (b) obtained in the production method of the present invention can be suitably used for applications in which a colorant (e.g. pigments and dyes) is added as another ingredient, such as paints, color inks, and color resists. From such a viewpoint, the AMA copolymer (b) of the present invention can be suitably used for colorant-dispersed compositions.

With respect to the colorant-dispersed composition, if the AMA copolymer (b) has a high molecular weight, it tends to achieve the characteristics (the copolymer is excellent in colorant dispersibility) even in the case of including the structural unit represented by formula (1) at a low ratio. In contrast, if the copolymer has a low molecular weight, it is more likely to achieve the characteristics in the case of including the structural unit at a higher ratio. This is presumably because that the number of the structural units represented by formula (1) per main chain (hereinafter, also referred to as the "average number of functional groups") has an influence on the achievement of the characteristics. From such a viewpoint, the average number of functional groups is preferably 0.5 or more. It is more preferably 1.0 or more, and further preferably 2.0 or more. The average number of functional groups is represented as follows.

$$\text{Average number of functional groups} = A/P$$

A: Number of moles of structural unit represented by formula (1) per unit mass [mol/g]

P: Number of moles of AMA copolymer (b) per unit mass [mol/g]

A may be calculated as follows, including the case of two or more species of the structural units represented by formula (1).

$$A = \Sigma AX (X=1, 2, 3, \ldots)$$

$$AX = \text{Unit mass} \times (CX/100)/FX$$

AX: Number of moles of Xth (X=1, 2, 3, ...) species of structural units represented by formula (1) per unit mass [mol/g]

CX: Weight ratio of Xth (X=1, 2, 3, ...) species of structural units represented by formula (1) per unit mass [% by mass]

FX: Molecular weight of Xth (X=1, 2, 3, ...) species of structural units represented by formula (1) [g/mol]

P may be approximated as follows using the number average molecular weight (Mn) of the AMA copolymer (b).

$$P = \text{Unit mass}/Mn$$

Mn: Number average molecular weight of AMA copolymer (b)

Therefore, the average number of functional groups is represented as follows with the symbols of CX, FX, and Mn.

$$\text{Average number of functional groups} = Mn \times \Sigma\{(CX/100) \times (1/FX)\} (X=1, 2, 3, \ldots)$$

Among the 1,6-dienes, the AMA monomer (a) represented by formula (2) is high in a ratio of cyclization (the ratio of producing the structural unit represented by formula (1) from the monomer represented by formula (2)), and thus CX and FX may be approximated as follows.

CX: Mass ratio of the reacted Xth (X=1, 2, 3, ...) species of AMA monomers (a) represented by formula (2) to all of the reacted monomers [% by mass]

FX: Molecular weight of the Xth (X=1, 2, 3, ...) species of AMA monomers (a) represented by formula (2) [g/mol]

In the case that each of the monomers used for polymerization is high in the reaction ratio (conversion ratio) (for example, the reaction ratio is 90 mol % or higher), CX may be approximated as follows.

CX: Mass ratio of the Xth (X=1, 2, 3, ...) species of AMA monomers (a) represented by formula (2) in monomer components (% by mass)

The aforementioned Mn can be measured by the measurement method mentioned in the following examples.

The AMA copolymer (b) is excellent in compatibility and resolubility after drying. Such excellent compatibility and resolubility after drying are presumably owing to the THF ring structure and the methylene groups on the respective sides of the THF ring structure. This is also presumed from the fact that tetrahydrofuran is a solvent often used for not only industrial applications but also analyzing and studying applications as a substance capable of dissolving a wide variety of substances.

As mentioned above, the AMA copolymer (b) is excellent in various characteristics, and thus can be suitably used for various applications. The characteristics owing to the THF ring can be achieved by a (meth)acrylic copolymer having a tetrahydrofurfuryl group in its side chain, such as a tetrahydrofurfuryl (meth)acrylate copolymer, for example; however, such a copolymer has difficulty in achieving high heat resistance and durability in contrast to the α-allyloxymethylacrylic copolymer of the present invention. In the case that the AMA copolymer (b) is used for a curable resin composition, for example, the composition can be suitably used for a sealant, an over-coating, and the like for electronic components. In such a case, since the composition achieves an oxygen-trapping ability and high heat resistance in a balanced manner, it protects elements and the like from degradation due to oxidation and heat.

The AMA copolymer (b) is an α-allyloxymethylacrylic copolymer formed by polymerization of the AMA monomer (a) and other radical polymerizable monomers. Such a copolymer can achieve characteristics owing to the other monomers in addition to the excellent characteristics owing to the AMA monomer (a), and thus the characteristics of the α-allyloxymethylacrylic copolymer can be controlled depending on factors such as the usage of the copolymer.

The kinds of the other radical polymerizable monomers and the structures of the structural units derived from the other radical polymerizable monomers are not particularly limited. Further, the configuration of the polymer is also not particularly limited. Examples of the configuration include a random copolymer, an alternating copolymer, a periodical copolymer, and a block copolymer. Here, the other radical polymerizable monomers are radical polymerizable monomers which are copolymerizable with the AMA monomer (a) and are not the AMA monomer (a). The other radical polymerizable monomers may include one kind of a monomer, or may include two or more kinds of monomers.

The other radical polymerizable monomers are monomers having a radical polymerizable unsaturated group which is polymerizable by heat or irradiation of active energy rays. The kinds, amounts, molecular weights, and the like of the other radical polymerizable monomers may be appropriately selected depending on the object and the application of the copolymer.

Examples of the other radical polymerizable monomers include monofunctional radical polymerizable monomers. Specific examples thereof include: (meth)acrylic esters such as methyl (meth)acrylate, ethyl (meth)acrylate, n-butyl (meth)acrylate, butyl (meth)acrylate, n-hexyl (meth)acrylate, 2-ethylhexyl (meth)acrylate cyclohexyl (meth)acrylate, lauryl (meth)acrylate, benzyl (meth)acrylate, isobornyl (meth)acrylate, 2-hydroxyethyl (meth)acrylate, and glycidyl (meth)acrylate;

(meth)acrylic amides such as N,N-dimethyl (meth)acrylamide and N-methylol (meth)acrylamide; unsaturated monocarboxylic acids such as (meth)acrylic acid, crotonic acid, cinnamic acid, and vinylbenzoic acid; unsaturated polycarboxylic acids such as maleic acid, fumaric acid, itaconic acid, citraconic acid, and mesaconic acid; unsaturated acid anhydrides such as maleic anhydride and itaconic anhydridearomatic vinyls such as styrene, α-methylstyrene, vinyltoluene, and methoxystyrene; and N-substituted maleimides such as methyl maleimide, ethyl maleimide, isopropyl maleimide, cyclohexyl maleimide, phenyl maleimide, benzyl maleimide, and naphthyl maleimide.

The weight average molecular weight (Mw) of the AMA copolymer (b) may be appropriately selected depending on the object and the application of the copolymer. For applications as liquids of radical curable resin compositions, colorant-dispersed compositions, and the like, the weight average molecular weight is preferably 100,000 or lower, more preferably 70,000 or lower, and further preferably 50,000 or lower, for good liquidity. For sufficient achievement of the characteristics as a polymer, the weight average molecular weight is preferably 1,000 or higher, and more preferably 3,000 or higher.

The AMA copolymer (b) has a polydispersity (Mw/Mn), which indicates molecular weight distribution, of preferably 5.0 or lower, more preferably 4.0 or lower, and further preferably 3.0 or lower. In the production method of the present invention, polymer branching can be controlled; thus, Mw/Mn can be made low.

The weight average molecular weight (Mw) and the polydispersity (Mw/Mn) may be measured by any methods. For example, they may be measured as mentioned in the following examples.

The molecular weight of the AMA copolymer (b) may be controlled by a common method. For example, it may be controlled depending on the amount and the kind of a polymerization initiator, the polymerization temperature, and the kind and the amount of a chain transfer agent.

The AMA copolymer (b) of the present invention can achieve the characteristics owing to the THF ring and the methylene groups on the respective sides thereof, such as an oxygen-trapping ability, adhesiveness, colorant dispersibility, compatibility, resolubility after drying, and transparency, and heat resistance and durability at high levels. The copolymer can be used for a wide variety of applications such as adhesives, pressure-sensitive adhesives, dental materials, optical components, information storage materials, optical fiber materials, color-filter resists, solder resists, plating resists, insulating materials, sealants, inkjet inks, printing inks, paints, casting materials, decorative laminates, WPCs, covering agents, photosensitive resin plates, dry films, lining agents, materials for civil engineering and construction, putty, reinforcing materials, floor materials, paving materials gel coatings, over-coatings, molding materials for techniques such as hand lay-up, spray up, pultrusion molding, filament winding, SMC, and BMC, and polymer solid electrolytes.

The following will describe the alkali-soluble resin of the present invention.

The alkali-soluble resin of the present invention is an alkali-soluble resin having the structural unit represented by formula (1) in its main chain.

The amount of the structural unit represented by formula (1) in the alkali-soluble resin of the present invention may be appropriately selected depending on the object, the application, and the molecular weight of the alkali-soluble resin of the present invention. It is generally 1 to 99 mol %, preferably 2 to 98 mol %, and further preferably 5 to 95 mol %, in all of the repeating structural units. If the alkali-soluble resin of the present invention has a high molecular weight, it tends to achieve the characteristics even in the case of including a small amount of the structural unit represented by formula (1). In contrast, if the alkali-soluble resin of the present invention has a low molecular weight, it is more likely to achieve the characteristics in the case of including a larger amount of the structural unit. This is presumably because that the number of the structural units represented by formula (1) per main chain (hereinafter, also referred to as the "average number of functional groups") has an influence on the achievement of the characteristics. The average number of functional groups is preferably 0.5 or more, more preferably 1.0 or more, and further preferably 2.0 or more.

The average number of functional groups may be determined in the same manner as mentioned above.

The alkali-soluble resin of the present invention has an acid group which provides alkali solubility. The acidity of the alkali-soluble resin of the present invention may be adjusted to a preferable value depending on the object and the application. The acidity is preferably 10 to 300 mgKOH/g, more preferably 15 to 250 mgKOH/g, and further preferably 20 to 200 mgKOH/g. An acidity within the above range provides sufficient alkali solubility for the alkali-soluble resin; particularly in the case that the resin is used for an alkali-developable resist, the resist can achieve good image-forming properties. If the alkali-soluble resin of the present invention has a high molecular weight, a higher acidity tends to cause better image-forming properties, while if the resin has a low molecular weight, even a low acidity tends to cause better image-forming properties.

Examples of the acid group which provides alkali solubility include functional groups which are neutralized with alkali water, such as a carboxyl group, a phenolic hydroxy group, carboxylic anhydride groups, a phosphate group, and a sulfonic group. Each of these may be used alone, or two or more of these may be used in combination. Preferable among these are a carboxyl group and carboxylic anhydride groups, and most preferable is a carboxyl group. An acid group may be introduced by a one-step introduction method, such as polymerizing monomer components including the monomer represented by formula (2) and a monomer having an acid group, or by an introduction method having two or more steps, such as preparing a resin having the structural unit represented by formula (1) in its main chain and then modifying the resin.

Examples of the monomer having an acid group used in the aforementioned one-step introduction include compounds having a functional group neutralized with alkali water, such as a carboxyl group, a phenolic hydroxy group, a carboxylic anhydride group, a phosphate group, or a sulfonic group, and a polymerizable unsaturated group. Specific examples thereof include unsaturated monocarboxylic acids such as (meth)acrylic acid, crotonic acid, cinnamic acid, and vinylbenzoic acid; unsaturated polycarboxylic acids such as maleic acid, fumaric acid, itaconic acid, citraconic acid, and mesaconic acid; unsaturated monocarboxylic acids in which the chain is extended between an unsaturated group and a carboxyl group, such as mono(2-acryloyloxyethyl)succinate and mono(2-methacryloyloxyethyl)succinate; unsaturated acid anhydrides such as maleic anhydride and itaconic anhydride; and phosphate group-containing unsaturated compounds such as LIGHT ESTER P-1M (Kyoeisha Chemical Co., Ltd.). Preferable among these are carboxylic monomers (unsaturated monocarboxylic acids, unsaturated polycarboxylic acids, and unsaturated acid anhydrides) due to their multiplicity of uses and availability.

The introduction method having two or more steps is not particularly limited as long as the structural unit represented by formula (1) is not lost during modification. Examples thereof include a two-step introduction method in which monomer components including a monomer with a functional group p are polymerized and then a compound with a functional group q which reacts with the functional group p to generate an acid group is reacted therewith. Alternatively, an introduction method may include three or more steps in which a monomer with a functional group r is polymerized, modification is repeatedly performed required times so that the functional group r is converted into a functional group p, and a compound with a functional group q is reacted. Examples of such a functional group p include active hydrogen groups such as a hydroxy group and an amino group; examples of the functional group q include polybasic acid anhydride groups.

Specific examples of the polybasic acid anhydride group-containing compound include succinic anhydride, dodecenyl succinate, pentadecenyl succinate, octadecenyl succinate, tetrahydrophthalic anhydride, methyltetrahydrophthalic anhydride, hexahydrophthalic anhydride, methylhexahydrophthalic anhydride, endomethylenetetrahydrophthalic anhydride, methylendomethylenetetrahydrophthalic anhydride, maleic anhydride, itaconic anhydride, phthalic anhydride, glutaric anhydride, phthalic anhydride, trimellitic anhydride, and pyromellitic anhydride. Each of these may be used alone, or two or more of these may be used in combination.

Examples of the two-step introduction method in which monomer components including a monomer with a functional group p are polymerized and then a compound with a functional group q reacting with the functional group p to generate an acid group is reacted therewith include a method in which monomer components including 2-hydroxyethyl (meth)acrylate are polymerized and then succinic anhydride is reacted therewith. Further, examples of the method having three or more steps in which the monomer with a functional group r is polymerized, modification is repeated required times so that the functional group r is converted into a functional group p, and then a compound with a functional group q is reacted therewith include a method in which monomer components including glycidyl (meth)acrylate are polymerized, (meth)acrylic acid is reacted therewith, and further succinic anhydride is reacted therewith.

The following will describe a polymer having a radical polymerizable unsaturated group in addition to an acid group.

The alkali-soluble resin of the present invention preferably has a radical polymerizable unsaturated group. The amount of the radical polymerizable unsaturated group may be appropriately adjusted depending on the object and the application. For good image-forming properties, the radical polymerizable unsaturated bond equivalent (molecular weight per chemical equivalent of radical polymerizable unsaturated bond) is preferably 200 to 5,000, more preferably 250 to 4,000, and further preferably 300 to 3,000.

Examples of the radical polymerizable unsaturated group include an acryloyl group, a methacryloyl group, a vinyl group, an allyl group, and a methallyl group. Each of these may be used alone, or two or more of these may be used in combination. Preferable among these are an acryloyl group and a methacryloyl group due to their good reactivity. Examples of a method for introducing the radical polymerizable unsaturated group include a method with two or more steps in which a resin having the structural unit represented by formula (1) in its main chain is prepared and then the resin is modified.

The introduction method having two or more steps is not particularly limited as long as the structural unit represented by formula (1) is not lost during modification. Examples thereof include a two-step introduction method in which monomer components including a monomer with a functional group s are polymerized, and then a monomer with a functional group t reactable with the functional group s is reacted therewith. Alternatively, an introduction method having three or more steps may be performed in which a monomer with a functional group u is polymerized, modification is repeated required times so that the functional group u is converted into a functional group s, and then a monomer with a functional group t is reacted therewith.

Examples of such a combination of the functional groups s and t include a carboxyl group and a hydroxy group, a carboxyl group and an epoxy group, a carboxyl group and an oxetanyl group, a carboxyl group and an isocyanato group, a hydroxy group and an isocyanato group, an acid anhydride group and a hydroxy group, and an acid anhydride group and an amino group. Preferable among these combinations is a combination of a carboxyl group and an epoxy group due to its rapid modification reaction, and good heat resistance and transparency.

Specific examples of the monomer with a carboxyl group include unsaturated monocarboxylic acids such as (meth)acrylic acid, crotonic acid, cinnamic acid, and vinylbenzoic acid; unsaturated polycarboxylic acids such as maleic acid, fumaric acid, itaconic acid, citraconic acid, and mesaconic acid; and unsaturated monocarboxylic acids in which a chain is extended between an unsaturated group and a carboxyl group, such as mono(2-acryloyloxyethyl)succinate and mono (2-methacryloyloxyethyl)succinate. Each of these may be used alone, or two or more of these may be used in combination.

Specific examples of the monomer with an epoxy group include glycidyl (meth)acrylate, β-methylglycidyl (meth) acrylate, β-ethylglycidyl (meth)acrylate, vinylbenzyl glycidyl ether, allyl glycidyl ether, 3,4-epoxycyclohexyl methyl (meth)acrylate, and vinylcyclohexene oxide. Each of these may be used alone, or two or more of these may be used in combination.

Specific examples of the two-step introduction method in which monomer components including a monomer with a functional group s are polymerized and then a monomer with a functional group t which is reactable with the functional group s is reacted therewith include a method in which monomer components including glycidyl (meth)acrylate are polymerized and then (meth)acrylic acid is reacted therewith. Specific examples of the introduction method having three or more steps in which a monomer with a functional group u is polymerized, modification is repeated required times so that the functional group u is converted into a functional group s, and then a monomer with functional group t is reacted therewith include a method in which monomer components including 2-hydroxyethyl (meth)acrylate are polymerized, succinic anhydride is reacted therewith, and further glycidyl (meth)acrylate is reacted therewith.

The alkali-soluble resin of the present invention is a resin having an acid group. In the case of introducing a radical polymerizable unsaturated bond, an acid group is also required to be introduced in some way. If a carboxyl group is used as the functional group s and an epoxy group is used as the functional group t, the resin having an acid group and a radical polymerizable unsaturated bond can be produced by controlling the amount of the carboxyl group to be excessive to the amount of the epoxy group upon reacting the carboxyl group and the epoxy group, or by reacting the carboxyl group and the epoxy group and then reacting a polybasic acid anhydride. Further, in the case that an epoxy group is used as the functional group s and a carboxyl group is used as the functional group t, the same can be achieved by reacting the carboxyl group and the epoxy group and then reacting a polybasic acid anhydride.

In the case that a carboxyl group is used as the functional group s and an epoxy group is used as the functional group t, specific examples of the method include a method in which monomer components including (meth)acrylic acid are polymerized, and then glycidyl (meth)acrylate is reacted under such a condition that the amount of the carboxyl group is excessive to that of the glycidyl (meth)acrylate, or glycidyl (meth)acrylate is reacted therewith and further succinic anhydride is reacted therewith.

In the case that an epoxy group is used as the functional group s and a carboxyl group is used as the functional group t, specific examples of the method include a method in which monomer components including glycidyl (meth)acrylate are polymerized, (meth)acrylic acid is reacted therewith, and further succinic anhydride is reacted therewith.

In the case of a combination of a carboxyl group and an epoxy group for the functional groups s and t, the step of reacting the carboxyl group and the epoxy group is performed at preferably 50° C. to 160° C., more preferably 70° C. to 140° C., and further preferably 90° C. to 130° C., so as to ensure a good reaction rate and to prevent gelation.

In the step of reacting the carboxyl group and the epoxy group, a basic catalyst for esterification or transesterification and an acidic catalyst, which are commonly used as catalysts, may be used for an increased reaction rate; a basic catalyst is preferable because it causes less side reactions. Preferable among basic catalysts are dimethylbenzylamine, triethylamine, tetramethyl urea, and triphenylphosphine because they lead to good reactivity and handleability, and they are free from halogens. Each of these catalysts may be used alone, or two or more of these may be used in admixture. The amount of the catalyst is 0.01 to 5.0% by mass, preferably 0.1 to 3.0% by mass, to the alkali-soluble resin of the present invention with a radical polymerizable unsaturated bond introduced therein.

The step of reacting the carboxyl group and the epoxy group is preferably performed with addition of a polymerization inhibitor in the presence of molecular-oxygen-containing gas in order to prevent gelation. Generally used molecular-oxygen-containing gases are gaseous oxygen or air diluted by inert gas such as nitrogen, and it is blown into a reaction vessel. The polymerization inhibitor may be a generally used polymerization inhibitor for radical polymerizable monomers. Examples thereof include phenolic inhibitors, organic acid copper salts, and phenothiazine. Preferable among these are phenolic inhibitors because of a low coloring property and a high polymerization inhibiting property; preferable among the phenolic inhibitors are methoquinone, 6-t-butyl-2,4-xylenol, and 2,6-di-t-butylphenol because of their easy availability and good economic efficiency. Each of these polymerization inhibitors may be used alone, or two or more of these may be used in admixture. The amount of the polymerization inhibitor is 0.001 to 1.0% by mass, and preferably 0.005 to 0.5% by mass, to the alkali-soluble resin of the present invention with a radical polymerizable unsaturated bond introduced therein so as to ensure a sufficient polymerization inhibiting effect and to achieve good curability in the case that the resin is used for a photosensitive resin composition.

The alkali-soluble resin of the present invention may have an epoxy group, and/or an oxetanyl group, and/or an alkoxysilyl group. The alkali-soluble resin having an epoxy group, and/or an oxetanyl group, and/or an alkoxysilyl group can have an increased cross-link density after the heat-curing step. The resin having an epoxy group, and/or an oxetanyl group, and/or an alkoxysilyl group can be suitably used as a binder resin for resists for color filters, especially resists for photo spacers, transparent resists for protecting films, and resists for interlayer insulating films.

The weight average molecular weight of the alkali-soluble resin of the present invention may be appropriately adjusted depending on the object and the application of the resin. It is 2,000 to 250,000, preferably 3,000 to 200,000, and further preferably 4,000 to 150,000, for good image-forming properties.

The weight average molecular weight may be determined by the method used in the following examples.

The following will describe a method for producing an α-allyloxymethylacrylic copolymer of the present invention.

The method for producing an α-allyloxymethylacrylic copolymer of the present invention is a method in which monomer components including the AMA monomer (a) are polymerized to produce an α-allyloxymethylacrylic copolymer. Cyclopolymerization of the AMA monomer (a) provides the AMA copolymer (b). The AMA copolymer (b) is excellent in heat resistance because it has a ring structure (THF ring) in its main chain; further, it is high in flexibility and excellent in compatibility and solvent-solubility because it has methylene groups on the respective sides of the THF ring.

The amount of the AMA monomer (a) may be appropriately adjusted depending on the object, the application, and the molecular weight of the AMA copolymer (b). It is preferably 1 to 99 mol %, more preferably 2 to 98 mol %, and further preferably 5 to 95 mol %, in all of the monomer components. The AMA copolymer (b) in an amount within the above range shows excellent characteristics owing to the structural unit represented by formula (1). The structural unit is a repeating unit which constitutes the polymer. One polymer has a plurality of structural units.

The AMA monomer (a) is more likely to be cyclopolymerized by radical polymerization than by ion polymerization. Further, radical polymerization is an industrially advantageous polymerization method. Thus, the production method preferably includes the step of radical polymerizing monomer components. If the condition is likely to cause polymer branching or gelation, for example, the case with a large amount of the AMA monomer (a) or the case with very high polymerization concentration, the production method more preferably includes the step of radical polymerizing monomer components in the presence of a chain transfer agent. Use of a chain transfer agent more effectively prevents polymer branching. Proceeding of polymer branching causes cross-linking and an increase in the polydispersity (Mw/Mn) which indicates the molecular weight distribution. Further proceeding of cross-linking leads the polymer to a solvent-swelled body which is insoluble to a solvent (a gel). Inhibition of branching leads to inhibition of these phenomena. Branch portions in the AMA copolymer tend to be poor in heat resistance; inhibition of branching leads to an increase in the heat resistance.

In general, a chain transfer agent is used for controlling a molecular weight. In polymerization of the AMA monomer (a), the chain transfer agent inhibits polymer branching, so that the polymer to be produced can have narrow molecular weight distribution, and the polymer can be produced without gelation even under industrially and economically advantageous conditions. If the polymerization is performed only with a polymerization initiator and without a chain transfer agent, the polymer to be produced has a wide molecular weight distribution and even the polymer may be gelated in some cases. Further, branch portions in the AMA copolymer are slightly poor in heat resistance; inhibition of branching leads to an increase in the heat resistance of the AMA copolymer to be produced.

It is unclear why the chain transfer agent shows the effect of inhibiting cross-linking (effect of inhibiting branching) specifically to the AMA monomer (a) among 1,6-diene monomers. This is presumably due to the fact that one of the two double bonds in the AMA monomer (a) is an allyl ether group. In cyclopolymerization of the 1,6-diene monomers, polymer branching probably occurs as shown in formula (5):

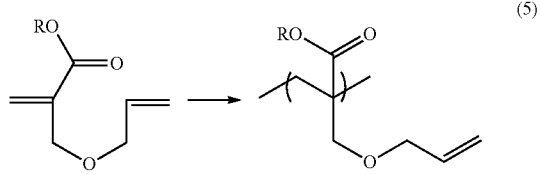

(5)

wherein R is a hydrogen atom or a C1-C30 organic group. That is, an uncyclized unit is formed; branching starts from the double bond in the uncyclized unit; and the polymer is cross-linked. Thus, in order to prevent branching, it is at least required to increase the cyclization ratio to reduce the number of uncyclized units as much as possible, or to prevent polymerization of double bonds in the uncyclized units. In the method for producing an α-allyloxymethylacrylic copolymer of the present invention, the chain transfer agent may interact with the allyl ether structure in the AMA monomer (a) by a mechanism of some kind to increase the cyclization ratio; presumably, however, the chain transfer agent mainly prevents polymerization of the double bonds (allyl ether groups) in the uncyclized units.

In the polymerization without the chain transfer agent, a growing reaction may continue to cause branching and branching may proceed to cause cross-linking if a radical is generated at the double bond in the uncyclized unit to react with a double bond of a monomer or another uncyclized unit. Further, if the radical reacts with a growing-end radical of the polymer or a radical generated at the double bond of another uncyclized unit, radical recombination may occur and cause branching, and proceeding of the branching may cause cross-linking. Further proceeding of such cross-linking may result in abnormally high molecular weight or gelation.

In contrast, in the polymerization with the chain transfer agent, a radical is presumably removed from the double bond in the uncyclized unit and a radical derived from the chain transfer agent is presumably generated alternatively. If this radical derived from the chain transfer agent has a sufficient polymerization-initiating ability, the polymerization reaction does not stop, and the polymerization can proceed without cross-linking if the radical preferentially reacts with a monomer rather than the double bond in the uncyclized unit. Such an effect is a specific effect exerted in the case of using the AMA monomer (a) represented by formula (2). In the case of polymerizing 1,6-diene having ester groups at the 2-position and the 6-position, the monomer is cyclopolymerized to mainly form a 6-membered ring (tetrahydropyran ring) and simultaneously form an uncyclized unit represented by formula (6):

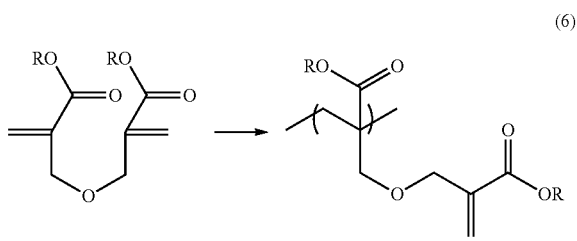

(6)

wherein each R may be the same as or different from each other and is a hydrogen atom or a C1-C30 organic group. The double bond in the uncyclized unit easily reacts with the double bond in a monomer or another uncyclized unit, and it is likely to cause abnormally high molecular weight or gelation especially under industrially and economically advantageous conditions (for example, conditions with a high polymerization concentration and conditions causing a high conversion ratio).

In the production method of the present invention, polymerization is performed using the AMA monomer (a) and the double bond in the uncyclized unit is converted into an allyl ether group as in the reaction of formula (5). In the case of adding a chain transfer agent, presumably, a radical generated in the allyl ether group preferentially reacts with the chain transfer agent to form a radical derived from the chain transfer agent, and this radical derived from the chain transfer agent has a sufficient polymerization initiating ability and preferentially reacts with a monomer.

The amount of the chain transfer agent may be appropriately adjusted depending on factors such as the kind of the chain transfer agent, the amount of the AMA monomer (a) in monomer components, the target molecular weight, the polymerization concentration, the amount of an initiator to be used together, and the polymerization temperature. It is preferably 0.03% by mass or more in 100% by mass of the monomer components. The chain transfer agent in an amount within the above range sufficiently achieves its effects and more effectively prevents polymer branching. The amount of the chain transfer agent is more preferably 0.05% by mass or more, and further preferably 0.1% by mass or more. No upper limit is set for the amount; the more the amount of the chain transfer agent is, the more the effects of the present invention is achieved. However, the amount is preferably 20% by mass or less in 100% by mass of the monomer components because it is uneconomical to use the chain transfer agent more than necessary and a problem of bad odor may occur.

The chain transfer agent may be any compound which is industrially used as what is called a chain transfer agent and which triggers chain transfer reaction in polymerization of radical polymerizable vinyl monomers. Preferable examples thereof include mercapto group-containing compounds (also referred to as "mercaptan-based compounds" or "mercaptan-based chain transfer agents") such as mercapto carboxylic acids, mercapto carboxylic esters, alkyl mercaptans, mercapto alcohols, aromatic mercaptans, and mercapto isocyanurates because of their easy availability, ability to inhibit cross-linking, small degree of reduction in polymerization rate. In other words, the chain transfer agent is preferably a mercapto group-containing compound.

Specific examples of the mercapto group-containing compound include mercaptan-type chain transfer agents such as mercapto carboxylic acids e.g. mercapto acetic acid and 3-mercapto propionic acid; mercapto carboxylic esters e.g. methyl mercapto acetate, methyl 3-mercaptopropionate, 2-ethylhexyl 3-mercaptopropionate, n-octyl 3-mercaptopropionate, methoxybutyl 3-mercaptopropionate, stearyl 3-mercaptopropionate, trimethylolpropane tris(3-mercaptopropionate), pentaerythritol tetrakis(3-mercaptopropionate), and dipentaerythritol hexakis(3-mercaptopropionate); alkyl mercaptans e.g. ethyl mercaptan, t-butyl mercaptan, n-dodecyl mercaptan, and 1,2-dimercapto ethane; mercapto alcohols e.g. 2-mercapto ethanol and 4-mercapto-1-butanol; aromatic mercaptans e.g. benzene thiol, m-toluene thiol, p-toluene thiol, and 2-naphthalene thiol; and mercaptoisocyanurates e.g. tris[(3-mercaptopropionyloxy)-ethyl]isocyanurate.

The chain transfer agent may be a chain transfer agent which is not a mercapto group-containing compound. Examples of the chain transfer agent which is not a mercapto group-containing compound include: disulfides such as 2-hydroxyethyl disulfide and tetraethylthiuram disulfide; dithiocarbamates such as benzyl diethyldithiocarbamate; dimers of monomer compound such as an α-methylstyrene dimer; and halogenated alkyls such as carbon tetrabromide.

Each of the chain transfer agents may be used alone or two or more of these may be used in combination.

The chain transfer agent may be added by any method as long as the chain transfer agent is present in at least a part of the period of the polymerization reaction (the state that the AMA monomer (a) and a radical which can initiate polymerization are present). For example, the agent may be added at once before the start of polymerization, added at once during the polymerization, or added from the start of the polymerization to the end of the polymerization. In order to reduce the amount of the chain transfer agent and to maximize the effects thereof, the agent is preferably added from the start of the polymerization to the end of the polymerization.

If monomer components are polymerized in the presence of the chain transfer agent, the polymer to be produced is terminated with a residue of the chain transfer agent (a group which constitutes a part of the chain transfer agent). Not all of the α-allyloxymethylacrylic copolymers produced by the polymerization are terminated with the residue of the chain transfer agent, and at least one polymer is in a state of being terminated with the residue of the chain transfer agent. Here, whether or not the chain transfer agent is used can be determined by checking an element or a functional group which is specific to the residue of the chain transfer agent through elementary analysis or a spectroscopic method (e.g. NMR, IR, and UV).

For industrial and economical advantages such as a high polymer conversion ratio and a short polymerization time, the polymerization is preferably performed with a concentration of monomer components (polymerization concentration) of 15% by mass or higher. In general, a higher polymerization concentration is more likely to cause polymer branching in cyclopolymerization of 1,6-diene monomers; however, a chain transfer agent can prevent polymer branching in cyclopolymerization of specific 1,6-dienes (the AMA monomers (a)) even with a high polymerization concentration. The polymerization concentration in the polymerization is more preferably 20% by mass or higher, further preferably 25% by mass or higher, and particularly preferably 30% by mass or higher. Here, the polymerization concentration is a concentration of the monomer components in 100% by mass of all of the monomer components, the chain transfer agent, and other optional components (e.g. a polymerization initiator and a solvent) to be used in the polymerization. In general, the amounts of a chain transfer agent and a polymerization initiator to be used in the polymerization are small. Thus, if a solvent is used in the polymerization, the polymerization concentration may be a concentration of the monomer components in 100% by mass of the sum of the monomer components and the solvent to be used in the polymerization for convenience. In other words, the polymerization is preferably performed with a concentration of the monomer, components (polymerization concentration) of 15% by mass or higher in 100% by mass of the sum of the polymerization solvent and the monomer components.

The monomer components may be polymerized by any polymerization method utilizing a radical polymerization mechanism. Examples thereof include bulk polymerization, solution polymerization, emulsion polymerization, and precipitation polymerization. The polymerization method may be appropriately selected depending on the object and the application; preferable among these is solution polymerization because it is industrially advantageous and enables easy control of the structures such as a molecular weight. In solution polymerization, the AMA monomer (a) is dissolved in a polymerization solution to be polymerized.

If the cyclopolymerization is performed by a solution polymerization method, a solution to be used may be prepared by dissolving material polymerizable monomers in a polymerization solvent at once, or may be prepared by adding material polymerizable monomers to a polymerization solvent in stages. For adding the polymerizable monomers to a polymerization solvent in stages in the cyclopolymerization, the polymerizable monomers may be added continuously, or may be added intermittently. This is the same as the method of adding the chain transfer agent.

In the case that the polymerizable monomers are dissolved into a polymerization solvent at once to prepare a solution and this solution is used for the polymerization, the polymerization concentration is a mass percentage (% by mass) of the polymerizable monomers added at once in 100% by mass of the total amount of the polymerization solvent, the polymerizable monomers added at once, the chain transfer agent, and optionally added other components. In the case of the addition in stages, the polymerization concentration is a mass percentage (% by mass) of all of the polymerizable monomers added in stages in 100% by mass of the total amount of the polymerization solvent and the polymerizable monomers added in stages. In general, the amounts of a chain transfer agent and a polymerization initiator to be used in the polymerization are small. Thus, for convenience, the polymerization concentration may be a concentration of the monomer components in 100% by mass of the sum of the monomer components and a solvent to be used in the polymerization.

In the polymerization of the monomer components by a solution polymerization method, the kind and the amount of a solvent to be used in the polymerization are not particularly limited as long as the solvent is inert to the polymerization reaction. They may be appropriately selected depending on the polymerization conditions such as the polymerization mechanism, the kinds and the amounts of the monomers to be used, the polymerization temperature, and the polymerization concentration, and the intended application of the α-allyloxymethylacrylic copolymer.

The polymerization solvent to be used may be alcohols, glycols, cyclic ethers, glycol ethers, esters of glycol monoethers, alkylesters, ketones, aromatic hydrocarbons, aliphatic hydrocarbons, amides such as dimethyl formamide, dimethyl acetoamide, and N-methylpyrrolidone, water, and the like. Each of these may be used alone or two or more or these may be used in combination.

The polymerization of the monomer components may be initiated by supplying energy required for polymerization initiation from an energy source such as heat, electromagnetic waves (e.g. infrared rays, ultraviolet rays, and X-rays), and electron beam for the monomer components. A radical polymerization initiator is preferably used together. This initiator greatly reduces energy required for initiating polymerization and enables easy reaction control.

The method for producing an α-allyloxymethylacrylic copolymer preferably includes the step of polymerizing monomer components including the AMA monomer (a) in the presence of a radical polymerization initiator. The method more preferably includes the step of polymerizing the monomer components including the AMA monomer (a) in the presence of a chain transfer agent and a radical polymerization initiator under the conditions where polymer branching and gelation easily occur, such as the case with a large amount of the AMA monomer (a), or the case with a very high polymerization concentration.

Examples of the radical polymerization initiator include polymerization initiators generating radicals by heat or light; for industrial and economical advantages, polymerization initiators generating radicals by heat (heat radical polymerization initiators) are preferable. Any heat radical polymerization initiators may be used as long as it generates a radical by supply of heat energy. It may be appropriately selected depending on the polymerization conditions such as the polymerization temperature, and the kind of a solvent to be used, and the kind of a monomer to be polymerized.

Examples of the heat radical polymerization initiator include peroxides and azo compounds. Each of these may be used alone or two or more of these may be used in combination. Reductants such as transition metal salts and amines may be used in combination with the polymerization initiator.

The amount of the polymerization initiator is not particularly limited and may be appropriately selected depending on the polymerization conditions such as the kinds and amounts of the monomers to be used, the polymerization temperature, and the polymerization concentration, and the target molecular weight of the polymer. In order to provide a polymer with a weight average molecular weight of thousands to several tens of thousands, the amount is preferably 0.05 to 20% by mass, and more preferably 0.1 to 15% by mass, in 100% by mass of all of the monomer components.

A preferable polymerization temperature and polymerization time in the cyclopolymerization depend on the kinds and the ratios of the polymerizable monomers to be used. The temperature is preferably 50° C. to 200° C., and more preferably 70° C. to 150° C. The polymerization time is preferably 20 hours or less, more preferably 10 hours or less, and further preferably 8 hours or less.

The cyclopolymerization is preferably performed such that the conversion ratio of the AMA monomer is to be 70% or higher for good economic efficiency and reduced influence on the characteristics due to the residual monomers when the polymer is used for various applications. In other words, the conversion ratio of the AMA monomer (a) is preferably 70% or higher in the polymerization. In cyclopolymerization of 1,6-dienes, a higher conversion ratio is more likely to cause polymer branching, in general. In the case that a chain transfer agent is used and a specific 1,6-diene (the AMA monomer (a)) is cyclopolymerized, polymer branching can be prevented even with a high conversion ratio. The conversion ratio is more preferably 80% or higher, further preferably 85% or higher, and particularly preferably 90% or higher.

The AMA copolymer (b) may be produced by polymerizing monomer components including the AMA monomer (a) represented by formula (2) to provide a polymer and then further modifying the polymer. The modification enables introduction of a radical polymerizable unsaturated group and introduction of a graft chain. In particular, the modification step that provides an AMA copolymer (b) having a radical polymerizable unsaturated group is preferable in that, for example, the AMA copolymer (b) shows improved curability in the case that the copolymer is used for a radical curable resin composition. In other words, the AMA copolymer (b) may be one produced by polymerizing monomer components including the AMA monomer (a) represented by formula (2) to provide a polymer and then modifying the polymer.

The modification may be performed by any method as long as the structural unit represented by formula (1) in the AMA copolymer (b) is not removed during the modification. Examples of the method include a method in which monomer components including a monomer with a functional group x are polymerized to provide a polymer and then a compound with a functional group y which can react with the functional group x is reacted therewith.

Examples of the combination of the functional groups x and y include a carboxyl group and a hydroxy group, a carboxyl group and an epoxy group, a carboxyl group and an isocyanato group, a hydroxy group and an isocyanato group, an acid anhydride group and a hydroxy group, and an acid anhydride group and an amino group. Specifically, a method which monomer components including (meth)acrylic acid are polymerized and then glycidyl (meth)acrylate is reacted therewith can provide a radical polymerizable unsaturated group-containing AMA copolymer (b). Further, a method in which monomer components including glycidyl (meth)acrylate are polymerized and then polycaprolactone having a carboxyl group at one end thereof is reacted therewith can provide an AMA copolymer (b) having polycaprolactone in its graft chain.

The present invention also relates to the α-allyloxymethylacrylic copolymer (AMA copolymer (b)) produced by the above production method.

Such an α-allyloxymethylacrylic copolymer may be produced by polymerizing a single kind of the AMA monomer (a) or may be produced by polymerizing multiple kinds of the AMA monomers (a).

It is also one aspect of the present invention that such a method for producing an α-allyloxymethylacrylic polymer having in its main chain the structural unit represented by formula (1):

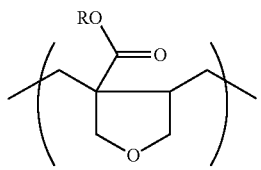

(1)

wherein R is a hydrogen atom or a C1-C30 organic group, comprising the step of polymerizing monomer components including only the α-allyloxymethylacrylic monomer represented by formula (2):

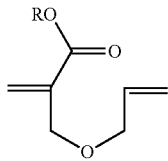

(2)

wherein R is a hydrogen atom or a C1-C30 organic group.

The following will describe the resin compositions of the present invention, that is, the radical curable resin composition, the colorant-dispersed composition, and the photosensitive resin composition, one by one.

The radical curable resin composition of the present invention is a radical curable resin composition containing a radical polymerizable monomer and a binder resin, wherein the binder resin is a resin having the structural unit represented by formula (1) in its main chain. Further, the binder resin which is used for the radical curable resin composition of the present invention and which has the structural unit represented by formula (1) in its main chain is also one aspect of the present invention.

First, the components of the radical curable resin composition of the present invention are described below. The radical curable resin composition of the present invention essentially comprises (A) a radical polymerizable monomer and (B) a binder resin. The binder resin (B) has the structural unit represented by formula (1) in its main chain. In addition to the above essential components, the radical curable resin composition of the present invention preferably comprises (C) a radical polymerization initiator for improved curability. Further, the composition may comprise (D) a diluent and (E) other components depending on the kinds of the radical polymerizable monomer and the binder resin, and the objects and required characteristics of the applications. The following will describe the respective components of the radical curable resin composition of the present invention.

(A) Radical Polymerizable Monomer

The radical polymerizable monomer is a low-molecular-weight compound having a radical polymerizable unsaturated group which is polymerizable by heat, irradiation of active energy rays, or the like, and it provides radical curability to the radical curable resin composition. In particular, those in a low viscous liquid state at normal temperature are called reactive diluents because they also serve as diluents for viscosity control; especially, they are preferably used in applications which require no use of solvents. Such a radical polymerizable monomer may be one commonly used as a radical polymerizable monomer, and one or a plurality of those may be appropriately selected depending on the object and the application. The radical polymerizable monomer is categorized into monofunctional radical polymerizable monomers having one radical polymerizable unsaturated group in one molecule and polyfunctional radical polymerizable monomers having two or more groups in one molecule.

The monofunctional radical polymerizable monomers may be the same as the other radical polymerizable monomers mentioned in the method for producing an α-allyloxymethylacrylic copolymer.

Preferably used among the polyfunctional radical polymerizable monomers are polyfunctional (meth)acrylates, polyfunctional urethane (meth)acrylates, and (meth)acryloyl group-containing polyfunctional monomers such as (meth)acryloyl group-containing isocyanurates because of their good reactivity and economic efficiency, and easy availability.

The molecular weight of the radical polymerizable monomer may be appropriately adjusted depending on the object and the application. It is preferably 2,000 or lower for easy handleability.

The amount of the radical polymerizable monomer may be appropriately adjusted depending on the kinds, objects, and applications of the radical polymerizable monomer and the binder resin to be used. For good radical curability and achievement of the characteristics of the binder resin, the amount is 5 to 1,000% by mass, preferably 15 to 700% by Mass, and further preferably 20 to 500% by mass, to the binder resin.

(B) Binder Resin

The binder resin is a high-molecular-weight compound which mainly controls the properties of the film after dried and the properties of the film after cured, and not a little contributes to the radical curability. The binder resin for the radical curable resin composition of the present invention may be the ft-allyloxymethylacrylic copolymer. Such a resin can reduce inhibition of radical polymerization due to oxygen, is excellent in adhesiveness and transparency, and is further excellent in heat resistance.

Expression of the aforementioned characteristics of the binder resin for the radical curable resin composition of the present invention is presumably owing to the THF ring in the structural unit represented by formula (1) and the methylene groups on the respective sides of the THF ring. As mentioned above, the binder resin of the present invention further shows the effect of reducing radical curing inhibition due to oxygen, and additionally the THF ring and the functional group on the substrate surface are likely to interact with each other; thus, good adhesiveness is presumably achieved.

One preferable mode of the radical curable resin composition of the present invention is a colored radical curable resin composition which is colored by a colorant (e.g. pigments and dyes) added as the other components, as well as paints, color inks, and color resists. The binder resin for the radical curable resin composition of the present invention is excellent in colorant-dispersion stability, as mentioned below. This is presumably because the THF ring which is a Lewis base and the functional group on the surface of a colorant (e.g. pigments and dyes) or the colorant dispersant interact with each other.

The binder resin for the radical curable resin composition of the present invention presumably effectively achieves the aforementioned characteristics owing to the structure that the THF ring in the polymer structure has methylene groups on the respective sides. The THF ring-derived characteristics can be also achieved to some extent by a (meth)acrylic copolymer having a tetrahydrofurfuryl group in a side chain; however, it cannot achieve as high heat resistance as the binder resin for the radical curable resin composition of the present invention.

A sealant, an over-coating, or the like for electronic components may be exemplified as preferable modes of the radical curable resin composition of the present invention. This is because the radical curable resin composition of the present invention achieves an oxygen-trapping ability (in other words, oxidation preventability) and heat resistance together, and it can prevent degradation of elements and the like due to oxidation and heat.

The weight average molecular weight of the binder resin for the radical curable resin composition of the present invention may be appropriately adjusted depending on the object and the application. It is generally 2,000 to 250,000, preferably 3,000 to 200,000, and further preferably 4,000 to 150,000.

The weight average molecular weight may be determined by the method used in the examples mentioned below.

The ratio of the binder resin for the radical curable resin composition of the present invention in the radical curable resin composition of the present invention may be appropriately adjusted depending on the kinds, objects, and applications of the radical polymerizable monomer and the binder resin to be used. The preferable amount thereof is as mentioned in the above radical polymerizable monomer.

As mentioned above, the binder resin for the radical curable resin composition may be the same as the α-allyloxymethylacrylic copolymer. Alternatively, an α-allyloxymethylacrylic polymer provided by polymerizing monomer components including only the AMA monomer (a) may be used. Even in such a case, the same effects are expected as in the case of using the α-allyloxymethylacrylic copolymer. In other words, use of the α-allyloxymethylacrylic polymer as the binder resin for the radical curable resin composition is also one aspect of the present invention.

(C) Radical Polymerization Initiator

The radical curable resin composition of the present invention may be cured by applying energy required for radical polymerization initiation to the radical curable resin composition of the present invention from an energy source such as heat, electromagnetic waves (e.g. infrared rays, ultraviolet rays, and X rays), or an electron beam. A radical polymerization initiator is preferably used together because it greatly reduces energy required for radical polymerization initiation and increases curability. The radical polymerization initiator includes heat radical polymerization initiators which generate a polymerization initiation radical by heat and photoradical polymerization initiators which generate a polymerization initiation radical by irradiation of energy rays such as electromagnetic waves or an electron beam; one or multiple of those commonly used can be used. Further, one or multiple of commonly used heat radical polymerization accelerators, photosensitizers, and photoradical polymerization accelerators may be preferably used if necessary.

The total amount of the radical polymerization initiators may be appropriately adjusted depending on the object and the application and is not particularly limited. For good balance of curability, influence of decomposition products, and economic efficiency, it is preferably 0.01 to 30% by mass, more preferably 0.05 to 20% by mass, and further preferably 0.1 to 15% by mass, in the whole radical curable resin composition.

The total amount of the heat radical polymerization accelerator, photosensitizer, and photoradical polymerization accelerator may be appropriately adjusted depending on the objects and the applications and is not particularly limited. For good balance of curability, influence of decomposition products, and economic efficiency, it is preferably 0.001 to 20% by mass, more preferably 0.01 to 10% by mass, and further preferably 0.05 to 10% by mass, in the whole radical curable resin composition.

(D) Diluent

In addition to the above essential components, a low viscous organic solvent or water may be optionally added as a diluent which dissolves the components in the radical curable resin composition or allows the components to be dispersed therein for the purpose of decreasing the viscosity to improve handleability, of forming a film by drying, and of serving as a dispersion medium of a colorant in the radical curable resin composition of the present invention.

The diluent may be the same as the polymerization solvents mentioned in the method for producing an α-allyloxymethylacrylic copolymer. Each of these may be used alone or two or more of these may be used in combination.

The amount of the diluent may be appropriately adjusted depending on the object and the application and is not particularly limited. In general, it is preferably 0 to 90% by mass, and more preferably 0 to 80% by mass, in the whole radical curable resin composition.

(E) Other Components

The radical curable resin composition of the present invention may contain components other than the above essential components depending on the objects and the required properties of the applications. Examples thereof include filler, resins other than the binder resin for the radical curable resin composition of the present invention, colorants (e.g. pigments and dyes), dispersants, plasticizers, polymerization inhibitors, ultraviolet absorbers, antioxidants, matting agents, antifoams, leveling agents, antistatic agents, dispersants, slipping agents, surface modifiers, thixotropic agents, thixotropic aids, coupling agents such as silane-based ones, aluminum-based ones, and titanium-based ones, cation polymerizable compounds, and acid generators.

In the case that the radical curable resin composition of the present invention is used for an adhesive or a pressure-sensitive adhesive, the composition may optionally comprise components such as a resin other than the binder resin for the radical curable resin composition of the present invention, an agent for imparting pressure-sensitive adhesiveness such as a tackifier, various fillers, a coloring agent, and a dispersant. The mode in which the adhesive or pressure-sensitive adhesive obtained thereby is applied onto a substrate such as metal, glass, paper, resin, or the like and is cured by heat or irradiation of active energy rays is also one preferable embodiment of the present invention.

In the case that the radical curable resin composition of the present invention is used for an ink or a coating, the composition may optionally comprise components such as a resin other than the binder resin for the radical curable resin composition of the present invention, various fillers, a colorant, a dispersant, drying oil, and a drier. The mode in which the ink or coating obtained thereby is applied onto a substrate such as metal, glass, paper, resin, or the like and is cured by heat or irradiation of active energy rays is also one preferable embodiment of the present invention.

In the case that the radical curable resin composition of the present invention is used for a curable molding material, the composition may optionally comprise a resin other than the binder resin for the radical curable resin composition of the present invention, various fillers, a colorant, a dispersant, and an ultraviolet absorber. The mode in which the curable molding material obtained thereby is cured as it is by heating or irradiation of active energy rays, or cured after impregnated with reinforcing fibers such as glass fibers, carbon fibers, or aramid fibers is also one preferable embodiment of the of the present invention.

In the case that the radical curable resin composition of the present invention is used for resist applications, the composition may optionally comprise an alkali-soluble binder resin, an epoxy resin, various fillers, a colorant, a dispersant, and the like. The mode in which the resist material obtained thereby is applied onto a substrate such as metal, glass, resin, or the like, cured by irradiation of active energy rays, and then developed by an alkali developer to form an image is also one preferable embodiment of the of the present invention.

The radical curable resin composition of the present invention can be obtained by blending, mixing, and dissolving or dispersing a radical polymerizable monomer, a binder resin, and other components such as additives.

The radical curable resin composition of the present invention can be used for a wide variety of applications such as adhesives, pressure-sensitive adhesives, biomaterials, dental materials, optical components, information storage materials, optical fiber materials, color-filter' resists, solder resists, plating resists, insulators, sealants, inkjet inks, printing inks, paints, casting materials, decorative laminates, WPCs, covering materials, photosensitive resin plates, dry films, lining materials, civil engineering and construction materials, putty, reinforcing materials, floor materials, paving materials gel coatings, over-coatings, materials for molding techniques such as hand lay-up, spray-up, pultrusion molding, filament winding, SMC, and BMC, and polymer solid electrolytes.

The following will describe the colorant-dispersed composition of the present invention.

The colorant-dispersed composition of the present invention is a colorant-dispersed composition comprising a colorant, a dispersant, a binder resin, and a liquid medium, wherein the binder resin is a resin having the structural unit represented by formula (1) in its main chain. Further, the binder resin for the colorant-dispersed composition of the present invention which has the structural unit represented by formula (1) in its main chain is also one aspect of the present invention.

First, the components of the colorant-dispersed composition of the present invention are described. The colorant-dispersed composition of the present invention essentially comprises (F) a colorant, (G) a dispersant, (H) a binder resin, and (I) a liquid medium. The binder resin (H) is a resin having the structural unit represented by formula (1) in its main chain. The composition may further comprise (J) other components depending on the objects and required characteristics of the applications. The following will describe the components of the colorant-dispersed composition of the present invention.

(F) Colorant

The colorant colors the colorant-dispersed composition of the present invention. Dyes and pigments which are commonly used as colorants may be used. Preferable are pigments (e.g. organic pigments and inorganic pigments) for good durability.

One colorant may be used or two or more colorants may be used in combination. Further, the colorant can have an appropriate average particle size depending on the object and the application. For example, the average particle size is preferably as small as 0.1 µm or smaller if transparency is required, and it is preferably as large as 0.5 µm or larger if concealability is required. Further, the colorant may be surface-treated by a technique such as rosin treatment, surfactant treatment, resin-based dispersant treatment, pigment derivative treatment, oxidized film treatment, silica coating, or wax coating, depending on the object and the application.

The ratio of the colorant in the colorant-dispersed composition of the present invention may be appropriately adjusted depending on the object and the application. For good balance of a coloring ability and dispersion stability, the ratio is generally preferably 0.1 to 70% by mass, more preferably 0.5 to 60% by mass, and further preferably 1 to 50% by mass, in the colorant-dispersed composition.

(G) Dispersant

The dispersant has an interacting part with a colorant and an interacting part with a dispersion medium (e.g. a liquid medium or a binder resin) and serves to stabilize dispersion of a colorant into a dispersion medium. Those which are generally used as a dispersant can be used as the dispersant. In general, the dispersant is categorized into resin-based dispersants (polymer dispersants), surfactants (low-molecular-weight dispersants), and dye derivatives.

One dispersant may be used alone, or two or more dispersants may be used in combination. The ratio of the dispersant in the colorant-dispersed composition of the present invention may be appropriately adjusted depending on the object and the application. For good balance of dispersion stability, durability (e.g. heat resistance, light resistance, and weather resistance), and transparency, the ratio thereof to the colorant is generally preferably 0.01 to 60% by mass, more preferably 0.1 to 50% by mass, and further preferably 0.5 to 40% by mass.

(H) Binder Resin

The binder resin for the colorant-dispersed composition of the present invention may be the same as the binder resin for the radical curable resin composition of the present invention. The THF ring in the structure of the binder resin for the radical curable resin composition of the present invention shows effects as what is called a Lewis base not so intensive as amines, which are strong bases, and has an appropriate basicity. Thus, presumably, the binder resin does not inhibit the effects of the dispersant and interacts with the colorant and the dispersant. Thereby, it more stabilizes the colorant dispersed by the dispersant.

The ratio of the binder resin for the colorant-dispersed composition of the present invention in the colorant-dispersed composition of the present invention may be appropriately adjusted depending on the object and the application. In general, it is preferably 0.1 to 90% by mass, more preferably 0.5 to 80% by mass, and further preferably 1 to 70% by mass in the colorant-dispersed composition.

(I) Liquid Medium

The liquid medium is a dispersion medium which uniformly keeps the colorant dispersed by the dispersant, and is a liquid substance which mainly controls the viscosity, coating characteristics, and drying characteristics of the colorant-dispersed composition. Such a liquid medium may be appropriately selected from those generally used as a liquid medium depending on the object and the application.

The amount of the liquid medium may be appropriately adjusted depending on the object and the application. In general, it is preferably 10 to 95% by mass, more preferably 20 to 90% by mass, and further preferably 30 to 85% by mass, in the colorant-dispersed composition.

(J) Other Components

The colorant-dispersed composition of the present invention may further comprise components other than the above essential components depending on the objects and required characteristics of the applications. For example, a photo-curable ink preferably comprises a photo-polymerizable monomer and a photo initiator in addition to the essential components; an air-curable coating preferably comprises a drying oil such as linseed oil and a drier such as cobalt octoate in addition to the essential components.

An alkali-developable resist ink such as a solder resist and a resist for color filters preferably comprises an alkali-soluble binder resin, an epoxy resin, a radical curable unsaturated group-containing resin, a polyfunctional acrylate, and a photo initiator, in addition to the essential components.

If necessary, the composition may further comprise an antioxidant, a stabilizer such as an ultraviolet absorber, a leveling agent, and a coupling agent such as a silane-based one, an aluminum-based one, or a titanium-based one.

The colorant-dispersed composition of the present invention can be prepared by a common dispersion method, and the method may be appropriately selected depending on the object and the application. Examples of a usable dispersion apparatus include a paint conditioner, a bead mill, a roll mill, a ball mill, a jet mill, a homogenizer, a kneader, and a blender. In order to reduce the particle size of the colorant, the colorant is preferably kneaded and dispersed with a roll mill, a kneader, a blender, or the like and then is finely dispersed with a media mill such as a bead mill. Preferably the dispersion product is optionally filtered through a filter or the like so that fine dusts are removed.

The components of the dispersion solution may be added into the dispersion apparatus at once or may be added successively, in any order; the method may be appropriately selected depending on the type of the dispersion apparatus and the like factors. All of the components (colorant, dispersant, binder resin, liquid medium, and other components) are not required to be added into the dispersion apparatus; alternatively, the colorant and minimum necessary components other than the colorant for dispersing the colorant with the dispersion apparatus may be charged into the apparatus and the colorant may be dispersed to prepare a colorant-dispersed composition containing the colorant at high concentration and then the components other than the colorant may be added and mixed therewith.

The following will describe the photosensitive resin composition of the present invention.

The photosensitive resin composition of the present invention is a photosensitive resin composition which comprises the alkali-soluble resin having the structural unit represented by formula (1) in its main chain as a binder resin. The present invention also relates to a color filter having a segment formed using the photosensitive resin composition and a liquid crystal display panel provided with the color filter.

The photosensitive resin composition of the present invention essentially comprises (K) the alkali-soluble resin of the present invention, (L) a radical polymerizable monomer, (M) a photo initiator, and (N) a solvent. Owing to its excellent heat resistance, the composition is suitably used for resists for forming components in the electronic information field, especially resists for color filters. Since the composition is excellent in colorant-dispersion stability, the mode in which the composition further essentially comprises (O) a colorant in addition to the above essential components to be a photosensitive colored resin composition is one of the best modes for showing the characteristics of the alkali-soluble resin of the present invention. Such a photosensitive colored resin composition is particularly suitably used for a coldr resist for color filters. The composition may further comprise (P) other components depending on the application and the object.

The color-filter resist include resists corresponding to the respective parts constituting a color filter, such as color resists (resists for forming red, green, and blue pixels and black matrices), resists for photo spacers, transparent resists for protecting films, and resists for interlayer insulating films.

The following will describe the respective components of the photosensitive resin composition of the present invention based on the resist for color filters of the present invention; the present invention is not limited thereto.

(K) Alkali-Soluble Resin of the Present Invention

The alkali-soluble resin of the present invention provides film formability and alkali solubility to resists. If the photosensitive resin composition of the present invention is used as a photosensitive colored resin composition, it also serves as a dispersion medium of the dispersed colorant.

The alkali-soluble resin of the present invention is high in heat resistance, as well as excellent in colorant dispersibility. Thus, it is very suitably used for a photosensitive colored resin composition, especially suitable for color resists for color filters. In general, a color resist for color filters is prepared by preparing a colorant dispersed solution (mill base) including ingredients such as a colorant, a dispersant, a binder resin, and a solvent, and then further adding thereto a transparent resist solution including ingredients such as a radical polymerizable monomer, a photo initiator, a binder resin, and a solvent. The alkali-soluble resin of the present invention is suitable for binder resins for mill bases and for binder resins for transparent resist solutions. The resin may be used for both of them or either one of them. Further, the resin may be used in admixture with a binder resin other than the alkali-soluble resin of the present invention. The preferable structure of the alkali-soluble resin of the present invention is as mentioned above; for color resists, the resin preferably has a structure of having a radical polymerizable unsaturated group in its side chain.

The alkali-soluble resin of the present invention is high in heat resistance, as well as has effects of increasing mechanical characteristics (e.g. reproducibility) and various image-forming properties. Thus, the resin can be also suitably used for resists for photo spacers. If the alkali-soluble resin of the present invention is used for resists for photo spacers, the preferable structure thereof is as mentioned above; in particular, the resin preferably has a structure of having a radical polymerizable unsaturated group, and/or an epoxy group, and/or an oxetanyl group, and/or an alkoxysilyl group, in its side chain.

The alkali-soluble resin of the present invention is high in heat resistance, as well as excellent in adhesiveness and transparency. Thus, the resin can be suitably used for transparent resists for protecting films and resists for interlayer insulating films. If the alkali-soluble resin of the present invention is used for transparent resists for protecting films and resists for interlayer insulating films, the preferable structure is as mentioned above; in particular, the resin preferably has a structure of having a radical polymerizable unsaturated group, and/or an epoxy group, and/or an oxetanyl group, and/or an alkoxysilyl group, in its side chain.

The ratio of the alkali-soluble resin of the present invention in the photosensitive resin composition of the present invention may be appropriately adjusted depending on the object and the application. In general, it is preferably 1 to 90% by mass, more preferably 3 to 80% by mass, and further preferably 5 to 70% by mass, in the components in the photosensitive resin composition except the solvent (N).

(L) Radical Polymerizable Monomer

The radical polymerizable monomer is a low-molecular-weight compound having a radical polymerizable unsaturated group which is polymerizable by irradiation of active energy rays such as electromagnetic waves (e.g. infrared rays, ultraviolet rays, and X rays) or an electron beam. It provides curability to the photosensitive resin composition of the present invention. As mentioned above, the radical polymerizable monomer is categorized into the monofunctional radical polymerizable monomers having one radical polymerizable unsaturated group in one molecule and the polyfunctional radical polymerizable monomers having two or more groups in one molecule; the polyfunctional radical polymerizable monomers are preferable for good curability. Such a radical polymerizable monomer may be the same radical polymerizable monomer as in the aforementioned radical curable resin composition of the present invention.

The molecular weight of the radical polymerizable monomer may be appropriately adjusted depending on the object and the application. It is preferably 2,000 or lower for good handleability.

The amount of the radical polymerizable monomer may be appropriately adjusted depending on the kinds, the objects, and the applications of the radical polymerizable monomer and the binder resin to be used. For good image-forming properties, it is generally preferably 3 to 90% by mass, more preferably 5 to 80% by mass, and further preferably 10 to 70% by mass, in the components in the photosensitive resin composition except the solvent (N).

(M) Photo Initiator

The photosensitive resin composition of the present invention comprises a photo initiator which generates a polymerization initiation radical by irradiation of active energy rays such as electromagnetic waves or an electron beam. One or multiple of photoradical polymerization initiators may be used which are the same as those indicated as components which may be contained in the radical curable resin composition of the present invention. Similarly to the photoradical polymerization initiator, one or multiple of the photo sensitizers, the photo radical polymerization accelerators, and the like components are preferably added thereto.

The total amount of the photo initiators may be appropriately adjusted depending on the object and the application and is not particularly limited. For good balance of curability, influence of decomposition products, and economic efficiency, it is preferably 0.1 to 30% by mass, more preferably 0.5 to 25% by mass, and further preferably 1 to 20% by mass in the components in the photosensitive resin composition except the solvent (N).

The total amount of the photo sensitizers and the Photo radical polymerization accelerators may be appropriately adjusted depending on the object and the application and is not particularly limited. For good balance of curability, influence of decomposition products, and economic efficiency, it is preferably 0.001 to 20% by mass, more preferably 0.05 to 15% a by mass, and further preferably 0.01 to 10% by mass in the components in the photosensitive resin composition except the solvent (N).

(N) Solvent

The solvent is a low viscous organic solvent or water which dissolves the components in the photosensitive resin composition or allows the components to be dispersed therein used for the purpose of decreasing viscosity to increase handleability, of forming a film by drying, and of serving as a dispersion medium for a colorant.

Such a solvent may be the same as the diluent indicated as the component which may be contained in the radical curable resin composition of the present invention. One solvent may be used alone, or two or more solvents may be used in combination.

The amount of the solvent may be appropriately adjusted depending on the object and the application and is not particularly limited. In general, it is preferably 10 to 90% by mass, and more preferably 20 to 80% by mass, in the whole photosensitive resin composition.

(O) Colorant

The colorant colors the photosensitive resin composition of the present invention to form it into a photosensitive colored resin composition. It may be the same as the colorant indicated above as the essential component for the colorant-dispersed composition of the present invention.

The ratio of the colorant in the photosensitive resin composition of the present invention may be appropriately adjusted depending on the object and the application. For good balance of a coloring ability and dispersion stability, the ratio is generally preferably 3 to 70% by mass, more preferably 5 to 60% by mass, and further preferably 10 to 50% by mass in the components in the photosensitive resin composition except the solvent (N).

(P) Other Components

The photosensitive resin composition of the present invention may further comprise other components in addition to the essential components depending on the objects and required characteristics of the applications. Examples thereof include: fillers, binder resins other than the alkali-soluble resin of the present invention, dispersants, heat-resistance improvers, developing aids, plasticizers, polymerization inhibitors, ultraviolet absorbers, Antioxidants, matting agents, anti-foaming agents, leveling agents, antistatic agents, dispersants, slipping agents, surface modifiers, thixotropic agents, thixotropic aids, coupling agents such as silane-based ones, aluminum-based ones, and titanium-based ones, quinonediazide compounds, polyphenol compounds, cation polymerizable compounds, and acid generators. The following will describe the preferable other components in the case that the photosensitive resin composition of the present invention is used as a resist for color filters.

<Binder Resin Other than the Alkali-Soluble Resin of the Present Invention>

The binder resin other than the alkali-soluble resin of the present invention can be used for controlling the balance of various characteristics of resists for color-filters, cost reduction of resists, and the like. Specific examples of such a binder resin include: (meth)acrylic acid copolymers such as (meth)acrylic acid/(meth)acrylic ester copolymers, (meth)acrylic acid/aromatic vinyl copolymers, (meth)acrylic acid/(meth) acrylic ester/aromatic vinyl copolymers, (meth)acrylic acid/(meth)acrylic ester copolymer/N-substituted maleimide copolymers, (meth)acrylic acid/aromatic vinyl/N-substituted maleimide copolymers, and (meth)acrylic acid/(meth)acrylic ester/polystyrene macromonomer copolymers; (meth)acrylic acid copolymers with a radical polymerizable unsaturated group introduced in its side chain; and vinyl ester-type alkali-soluble resins formed by adding (meth)acrylic acid to an epoxy resin and further reacting a polybasic acid anhydride therewith.

The amount of such a binder resin other than the alkali-soluble resin of the present invention may be appropriately adjusted depending on the object and the application as long as the characteristics of the alkali-soluble resin of the present invention are not deteriorated.

The amount is preferably such that the ratio of the alkali-soluble resin of the present invention in the whole binder resin is 5% by mass or more, more preferably 10% by mass or more, and further preferably 20% by mass or more, in the photosensitive resin composition.

<Dispersant>

The dispersant is a component which is preferably added together with the essential components in the case that a colorant is added to the photosensitive resin composition of the present invention so that the composition is formed into a photosensitive colored resin composition. The dispersant can be the same as the dispersant which is the essential component of the colorant-dispersed composition of the present invention.

The ratio of the dispersant in the photosensitive resin composition of the present invention may be appropriately adjusted depending on the object and the application. For good balance of dispersion stability, durability (e.g. heat resistance, light resistance, and weather resistance), and transparency, the ratio thereof to the colorant is generally preferably 0.01 to 60% by mass, more preferably 0.1 to 50% by mass, and further preferably 0.5 to 40% by mass.

<Heat-Resistance Improver>

The photosensitive resin composition of the present invention may comprise an N-(alkoxymethyl)melamine compound and a compound having two or more groups such as epoxy groups and oxetanyl groups for improved heat resistance and strength. Particularly in the case that the composition is used for resists for photo spacers, transparent resists for protecting films, or resists for interlayer insulating films, the composition preferably comprises these compounds.

<Leveling Agent>

The photosensitive resin composition of the present invention may comprise a leveling agent for an improved leveling ability. Preferable examples of the leveling agent include fluorine-based surfactants and silicon-based surfactants.

<Coupling Agent>

The photosensitive resin composition of the present invention may comprise a coupling agent for improved adhesiveness. Preferable examples of the coupling agent include silane-based coupling agents. Specific examples thereof include epoxy-based, methacryl-based, and amino-based silane coupling agents; particularly preferable are epoxy-based silane coupling agents.

<Developing Aid>

For improved developability, the photosensitive resin composition of the present invention may comprise: monocarboxylic acids such as (meth)acrylic acid, acetic acid, and propionic acid; polycarboxylic acids such as maleic acid, fumaric acid, succinic acid, tetrahydrophthalic acid, and trimellitic acid; and carboxylic anhydrides such as maleic anhydride, succinic anhydride, tetrahydrophthalic anhydride, and trimellitic anhydride, as a developing aid.

The photosensitive resin composition of the present invention can be prepared by mixing and dispersing the alkali-soluble resin of the present invention, a radical polymerizable monomer, a photo initiator, and a solvent, and optionally other required components such as a colorant, a dispersant, another binder resin, and a leveling agent with an apparatus such as a mixer or a dispersing apparatus.

If the photosensitive resin composition of the present invention comprises a colorant, the composition is prepared by a method including dispersion of a colorant. For example, predetermined amounts of a colorant, a dispersant, a binder resin, and a solvent are weighed and the colorant is dispersed in a fine-particle state with a dispersing apparatus such as a paint conditioner, a bead mill, a roll mill, a ball mill, a jet mill, a homogenizer, a kneader, or a blender to prepare a liquid-state colorant-dispersed solution (mill base). Preferably, the components are kneaded with an apparatus such as a roll mill, a kneader, or a blender so that the colorant is dispersed, and then the colorant is finely dispersed with a media mill such as a bead mill with 0.01- to 1-mm beads charged therein. To the obtained mill base is added a transparent resist solution which has been separately prepared by stir-mixing a radical polymerizable monomer, a photo initiator, a binder resin, a solvent, a leveling agent, and the like to form a uniformly dispersed solution; thereby a photosensitive colored resin composition is obtained. Preferably, the obtained photosensitive colored resin composition is filtered through a filter or the like so that fine dusts are removed.

The present invention also relates to a color filter having a segment formed using the photosensitive resin composition. The segment (e.g. black matrices, red, green, and blue pixels, photo spacers, protecting layers, and ribs for alignment control) of the color filter may be formed by a method such as photolithography, printing, electrodeposition, or inkjet. The photolithography includes a method using a negative acrylic photosensitive resin composition (photosensitive acryl method), which is the leading method, and a method using a non-photosensitive polyimide-based resin composition and a positive resist (non-photosensitive polyimide method). The photosensitive acryl method specifically includes applying a negative photosensitive resin composition to a supporting substrate; drying the composition to form a film; placing a photo mask on the formed film; exposing the film to light through the photo mask so that the exposed portion is photo-cured; developing the non-exposed portion; optionally washing the workpiece; and further heat curing or photo-curing the workpiece to form segments of color filters. Particularly in the case of large supporting substrates, the composition is applied using a slit application apparatus, in general. Use of the photosensitive resin composition of the present invention as such a negative photosensitive resin composition enables formation of high quality segments of color filters in high yield. In addition, the alkali-soluble resin and the photosensitive resin composition of the present invention can be used for formation of segments of color filters by the inkjet method owing to their excellent resolubility after drying.

For liquid crystal display devices, the color filter is required to have a structure that pixels are formed on a transparent substrate, while for image pick-up device, pixels are required to be formed on a photoelectric conversion element substrate. If necessary, a black matrix for separating pixels is formed, a protecting film is formed on pixels, a photo spacer is formed on the black matrix area, a transparent electrode made of a substance such as ITO is formed on pixels or a protecting film, and an alignment film and a structure for alignment control are formed. In some cases, a black matrix and pixels, and optionally a protecting film, a photo spacer, and the like are formed on a transparent substrate with TFTs (thin film transistors) formed thereon.

The color filter of the present invention can be provided with at least one segment formed using the photosensitive resin composition of the present invention; preferably all of the colors of the pixels, and more preferably the black matrix and the pixels are formed using the photosensitive resin composition of the present invention. The photosensitive resin composition of the present invention is particularly suitably used for pixels required to be colored and black matrices; further, the composition is also suitable for forming segments which is not required to be colored, such as a photo spacer and a protecting layer.

Examples of the transparent substrate include glass substrates, thermoplastic sheets of polyester, polycarbonate, polyolefin, polysulfone, ring-opened polymers of circular olefin and hydrides thereof, and thermosetting plastic sheets of resins such as epoxy resin and unsaturated polyester resin. Preferable are glass substrates and heat-resistant plastic sheets for high heat resistance. If necessary, the transparent substrate may be subjected to corona discharge treatment, ozone treatment, or chemical treatment with an agent such as a silane coupling agent.

The black matrix is formed on the transparent substrate using a metal thin film or a photosensitive colored resin composition for black matrices. The black matrix produced using a metal thin film is formed so as to have a single layer of chrome or two layers of chrome and chrome oxide, for example. In such a case, a thin layer of the metal or thin layers of the metal and the metal oxide is/are first formed on the transparent substrate by vapor evaporation, sputtering, or the like. A positive photosensitive film is then formed thereon, and the photosensitive film is exposed to light through the photo mask and is developed to form a black matrix image. Thereafter, the film is etched to form a black matrix. In the case of using the photosensitive colored resin composition for black matrices, a black matrix is formed according to the aforementioned method of forming segments by the photosensitive acryl method.

Pixels generally have three colors: red, green, and blue. In one example, green pixels are first formed using a green-colored photosensitive composition according to the segment formation by the photosensitive acryl method. This operation is performed for the other two colors, and thereby pixels with the respective three colors are formed. The order of forming the pixels is not limited by their colors.

The protecting film is optionally formed on the pixels after the pixel formation according to the segment formation by the photosensitive acryl method using a transparent photosensitive resin composition for protecting films. For cost reduction and process simplification, a protecting film may not be formed in some cases.

If a transparent electrode is formed on the pixels or the protecting film, a film is formed by sputtering, vacuum evaporation, CVD, or the like using indium tin oxide (ITO), zinc oxide (ZnO), tin oxide (SnO), or the like, or alloys thereof, and is optionally formed in a predetermined pattern by etching with a positive resist or by jigs. In some liquid crystal driving modes such as an in-plane switching mode (IPS mode), a transparent electrode may not be formed.

If necessary, photo spacers are formed directly on the black matrix or on the protecting film or the transparent electrode so as to correspond to the black matrix area according to the segment formation by the photosensitive acryl method using a photosensitive resin composition for photo spacers. In some cases, no photo spacer is formed and particle-shaped spacers are used for keeping the cell gap.

The photosensitive resin composition may be applied onto the substrate by spin coating, slit coating, roll coating, cast coating, or the like. In the case of the photosensitive resin composition of the present invention, slit coating is particularly preferable. Conditions for slit coating depend on the style of slit coating, that is, slit-and-spin or spinless, the size of the transparent substrate, target film thickness, and the like; the ejection amount from the nozzle and the moving rate of the slit head are appropriately selected. The lip width of the nozzle tip is generally 30 to 500 μm, and the distance between the nozzle tip and the substrate is generally 30 to 300 μm. The photosensitive resin composition of the present invention may be suitably used in spin coating, roll coating, and cast coating. The thickness of the coated film is generally 0.3 to 3.5 μm for the black matrix, pixels, and protecting film, and it is generally 1 to 10 μm for the photo spacers.

The film applied onto the substrate is dried with an apparatus such as a hot plate, an IR oven, or a convection oven. Drying conditions are appropriately selected depending on the boiling points of the contained solvent components, the kinds of the curable components, the film thickness, the performance of the drier, and the like. In general, drying is performed for 10 to 300 seconds at 50° C. to 160° C.

The exposure is a step of irradiating the coated film with active rays through a mask with a predetermined pattern. Examples of a source of the active rays include lamp sources such as a xenon lamp, a halogen lamp, a tungsten lamp, a high-pressure mercury lamp, an ultra-high-pressure mercury lamp, a metal halide lamp, a middle-pressure mercury lamp, a low-pressure mercury lamp, a carbon arc, and a fluorescent lamp; and laser sources such as argon ion laser, YAG laser, excimer laser, nitrogen laser, helium cadmium laser, and semiconductor laser. Examples of the type of the exposing apparatus include proximity type apparatuses, mirror projection type apparatuses, and stepper type apparatuses. Preferably used among these are proximity type apparatuses.

After the exposure, the film is developed using a developing solution and the unexposed portion is removed to form a pattern. Any developing solution may be used as long as it dissolves the photosensitive resin composition of the present invention. Generally used are organic solvents and alkaline aqueous solutions. If an alkaline aqueous solution is used as the developing solution, the workpiece is preferably further washed with water after the development. The alkaline aqueous solution may optionally contain a surfactant, an organic solvent, a buffer, a dye, and a pigment in addition to an alkaline agent. Examples of the alkaline agent include: inorganic alkaline agents such as sodium silicate, potassium silicate, sodium hydroxide, potassium hydroxide, lithium hydroxide, trisodium phosphate, disodium phosphate, sodium carbonate, potassium carbonate, and sodium hydrogencarbonate; and amines such as trimethylamine, diethylamine, isopropylamine, n-butylamine, monoethanol amine, diethanol amine, triethanol amine, tetramethylammonium hydroxide, and tetraethylammonium hydroxide. Each of these may be used alone, or two or more of these may be used in combination. Examples of the surfactant include nonionic surfactants such as polyoxyethylene alkyl ethers, polyoxyethylene alkyl esters, sorbitan alkyl esters, and monoglyceride alkyl esters; anionic surfactants such as alkylbenzene sulfonic acid salts, alkylnaphthalene sulfonic acid salts, alkyl sulfuric acid salts, alkyl sulfonic acid salts, and sulfosuccinic ester salts; and amphoteric surfactants such as alkyl betaines and amino acids. Each of these may be used alone, or two or more of these may be used in combination. Examples of the organic solvents include alcohols such as isopropanol, benzyl alcohol, ethyleneglycol monoethyl ether, ethyleneglycol monobutyl ether, and propylene glycol. Each of these may be used alone, or two or more of these may be used in combination. The development is generally performed at a developing temperature of 10° C. to 50° C. by a technique such as immersion development, spray development, brush development, or ultrasonic-wave development.

After the development, the workpiece is generally heated for 5 to 60 minutes at 150° C. to 250° C. with a heating apparatus such as a hot plate, a convection oven, or a high-frequency heater for heat curing.

The color liquid crystal display panel of the present invention is a liquid crystal display panel provided with the color filter of the present invention. The liquid crystal display panel of the present invention can be produced by forming an alignment film on the inner side of the color filter, attaching the color filter with the opposite substrate, and charging a liquid crystal compound into the gap therebetween.

The alignment film is preferably a resin film of polyimide, for example. In general, the film is surface-treated by a technique such as ultraviolet-ray treatment or rubbing treatment after the application and heat-firing. The liquid crystal compound is not particularly limited and commonly used ones may be used. The opposite substrate is preferably a TFT substrate, and those produced by a common method can be used. The gap between the color filter and the opposite substrate is generally 2 to 8 μm. After the attachment of the opposite substrate and the color filter, a sealant is attached to seal the workpiece. Thereby, a liquid crystal display panel is completed.

EFFECTS OF THE INVENTION

The present invention provides the AMA copolymer. (b) which has the structural unit represented by formula (1) in its main chain, which is good in curability in the air (oxygen-trapping ability), adhesiveness, and transparency, and is excellent in heat resistance. Further, the present invention provides the α-allyloxymethylacrylic copolymer which prevents polymer branching, abnormally high molecular weight, and gelation upon the radical polymerization of the AMA monomer (a) in the method for producing the AMA copolymer (b), so that it enables easy adjustment of the performance and easy imparting of various characteristics suitable for the respective applications, which causes good production stability and strict quality control. The α-allyloxymethylacrylic copolymer is suitably used for the applications requiring high quality various characteristics and strict quality control, such as optical applications and resist materials. As a result, the α-allyloxymethylacrylic copolymer obtained by the production method of the present invention has higher heat resistance than resins having the structural unit represented by formula (1) in their main chain obtained by a production method other than the method of the present invention. Thus, the copolymer of the present invention is more suitably used for applications requiring heat resistance.

Furthermore, the radical curable resin composition of the present invention provides a radical curable resin composition which is excellent in curability in the air (oxygen-trapping ability), as well as in adhesiveness and transparency, and remarkably excellent in heat resistance. Thus, the radical curable resin composition of the present invention is particularly suitably used for applications requiring heat resistance among the applications in which a radical-curable composition is used, such as sealants for electronic components, overcoatings, coating materials, adhesives, solder resists, color filter resists, lenses for electronic components, and molding materials.

The colorant-dispersed composition of the present invention provides a colorant-dispersed composition which achieves dispersibility and other characteristics such as adhesiveness and curability in a highly balanced manner. Further, the binder resin of the present invention which is a component of the colorant-dispersed composition is good in production stability.

The photosensitive resin composition of the present invention provides an alkali-soluble resin which is remarkably excellent in heat resistance and colorant dispersibility, and is excellent in image-forming properties, and a photosensitive resin composition comprising the resin. Since the photosensitive resin composition is excellent in heat resistance, it is suitably used for resists for forming components in the electronic information field, such as solder resists, etching resists, interlayer insulating materials, plating resists, and resists for color filters. In addition, the composition is excellent in colorant dispersibility, and it is particularly suitably used for forming colored layers of color filters.

BRIEF DESCRIPTION OF THE DRAWINGS

FIG. 1 is a $^1$H-NMR chart determined using powdery resin obtained in Example 8;

FIG. 2 is a $^1$H-NMR chart determined using powdery resin obtained in Example 16.

FIG. 3 is a $^1$H-NMR chart determined using powdery resin obtained in Reference Example 1.

MODES FOR CARRYING OUT THE INVENTION

Figure 1:
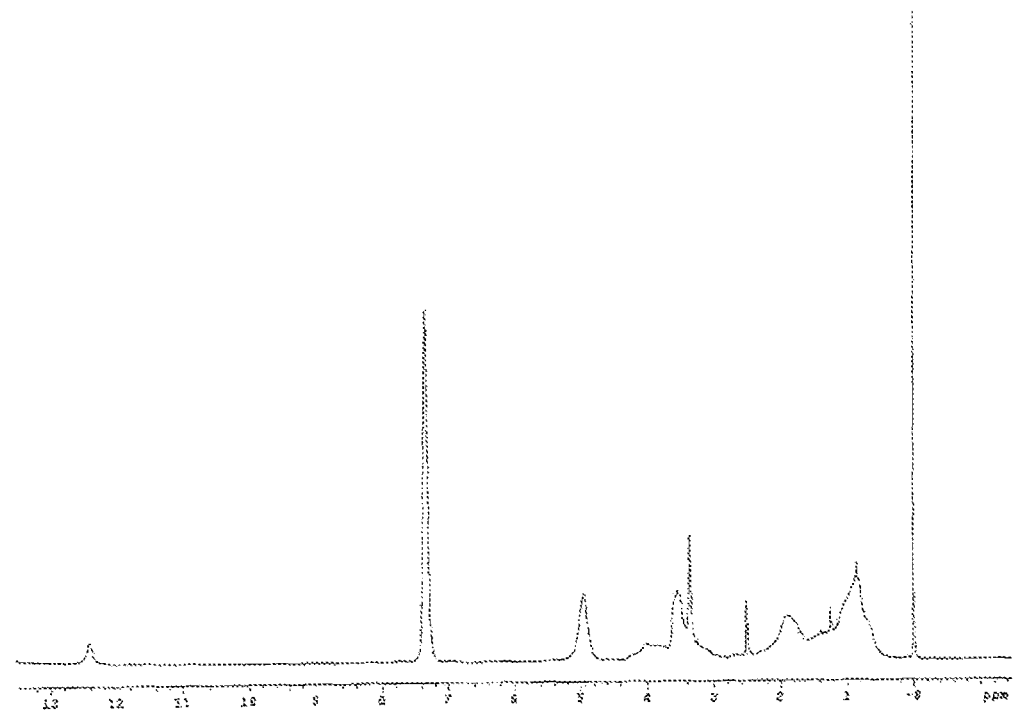
[FIG. 1]

The following will describe the present invention in more detail referring to, but not limited to, examples. Hereafter, the term "part(s)" means "part(s) by weight" and the symbol "%" means "% by mass" unless otherwise mentioned.
<Analysis>
The analysis in the examples was performed as follows.
(Mw, Mn, Mw/Mn)
The resin solution was diluted by tetrahydrofuran and filtered through a filter having a pore diameter of 0.45 μm. The filtrate was measured under the following conditions with the following gel permeation chromatography (GPC) apparatus.
Apparatus: HLC-8220GPC (TOSOH Corp.)
Elution solvent: tetrahydrofuran
Standard substance: standard polystyrene (TOSOH Corp.)
Separation column: TSKgel SuperHZM-M (TOSOH Corp.) (Average number of functional groups)

Average number of functional groups=Mn×{(weight ratio of AMA-R in monomer components [% by mass]/100)×(1/molecular weight of AMA-R)}

(Polymerization Concentration)

Polymerization concentration [% by mass]=total amount of monomers used for polymerization/ (total amount of monomers used for polymerization 1 total amount of solvents used for polymerization)×100

(Recovery of Resin)
Part of the resin solution was diluted by tetrahydrofuran, and the diluted solution was added to an excessive amount of hexane for reprecipitation. The precipitate was filtered out, and was vacuum dried at 70° C. (for 5 hours or longer). Thereby, white powdery resin was obtained.
($^1$H-NMR Measurement)
The white powdery resin (200 mg) obtained above was dissolved in deuterated dimethyl sulfoxide containing tetramethylsilane (3 g), and was measured using a nuclear magnetic resonance apparatus (200 MHz, Varian).
(Solids Content)
The resin solution (about 0.3 g) was put into an aluminum cup, and acetone (about 2 g) was added thereto. The resin solution was dissolved into acetone, and then was air-dried at normal temperature. The air-dried resin was dried for 3 hours at 140° C. using a hot-air drier, and was allowed to stand to cool in a desiccator. The amount of the resulting product was weighed, and the solids content in the resin solution was calculated based on the reduced amount.
(Thermogravimetric Analysis)
The powdery polymer (resin) obtained by the reprecipitation was measured under the following conditions using the following measurement apparatus. Thereby, a dynamic TG curve was obtained. Further, a 5% weight reduction temperature was obtained based on the obtained TG curve.
Apparatus: Thermo Plus TG8120 (Rigaku Corp.)
Atmosphere: nitrogen flow 100 ml/min.
Conditions for temperature increase: stepwise isothermal analysis (SIA mode), rate of temperature increase=10° C./min., value of mass change rate=0.005%/sec.

(Resin Acidity)

The acidity of the polymer (resin) solution was measured using a 0.1-N KOH aqueous solution as a titrant with an automatic titration apparatus (Hiranuma Sangyo Co., Ltd., COM-555). The solids content acidity was calculated based on the acidity of the solution and the solids content, and the obtained value was used as the resin acidity.

<Synthesis of Monomer Represented by Formula (2)>
[Syntheses Examples 1 to 5]

As shown in Table 1, an α-allyloxymethylacrylic ester (AMA-R) which is a monomer represented by formula (2) was synthesized from an allyl alcohol and the corresponding α-hydroxymethyl acrylic ester (HMA-R) with 1,4-diazabicyclo[2.2.2]octane as a catalyst according to JP-A 10-226669.

TABLE 1

| | Structure of ester part in HMA-R | Monomer (AMA-R) represented by formula (2) | |
|---|---|---|---|
| | | Compound name | Abbreviation |
| Synthesis Example 1 | Methyl | Methyl α-allyloxymethylacrylate | AMA-M |
| Synthesis Example 2 | Cyclohexyl | Cyclohexyl α-allyloxymethylacrylate | AMA-CH |
| Synthesis Example 3 | Isobornyl | Isobornyl α-allyloxymethylacrylate | AMA-IB |
| Synthesis Example 4 | Benzyl | Benzyl α-allyloxymethylacrylate | AMA-BZ |
| Synthesis Example 5 | Phenoxyethyl | Phenoxyethyl α-allyloxymethylacrylate | AMA-PE |

<Polymerization>

EXAMPLE 1

A reaction vessel was prepared which was a four-neck separable flask provided with a thermometer, a condenser, a gas inlet tube, and a stirrer. The air inside the reaction vessel was replaced by nitrogen. Under nitrogen stream, propylene glycol monomethyl ether acetate (PGMEA, 213.5 parts) was charged into the reaction vessel, and was heated up to 90° C. Separately, a dropping vessel A was charged with AMA-M (121.8 parts) obtained in Synthesis Example 1 and methyl methacrylate (MMA, 78.2 parts); a dropping vessel B was charged with a stirred mixture of t-butyl peroxy-2-ethylhexanoate (PBO, 4.7 parts) and PGMEA (42.0 parts); and a dropping vessel C was charged with a stirred mixture of methyl 3-mercaptopropionate (MPM, 3.5 parts) and PGMEA (44.5 parts).

After the internal temperature of the reaction vessel became stable, dropwise addition of the mixtures in the dropping vessels A, B, and C were started at the same time. While the internal temperature was controlled at 90° C., the respective mixtures were dropwise added to the reaction vessel from the dropping vessel A over 3 hours, from the dropping vessel B over 3.5 hours, and from the dropping vessel C over 4 hours, to cause polymerization reaction. After the dropwise addition was finished, warming was started and the temperature was raised up to 115° C. The temperature was kept at 115° C. for 1 hour, and then was cooled down to room temperature. Thereby, a resin solution was obtained. Further, white powdery resin was obtained by the above reprecipitation. Table 2 shows the analysis results.

EXAMPLE 2

A reaction vessel was prepared which was a three-neck separable flask provided with a thermometer, a condenser, a gas inlet tube, and a stirring apparatus. The air inside the reaction vessel was replaced by nitrogen. Under nitrogen stream, PGMEA (150.0 parts) was charged into the reaction vessel, and was heated up to 90° C. Separately, a dropping vessel was charged with a stirred mixture of AMA-M (60.9 parts), MMA (39.1 parts), and PEO (6.0 parts).

After the internal temperature of the reaction vessel became stable, dropwise addition of the mixture in the dropping vessel was started. While the internal temperature was controlled at 90° C., the mixture was dropwise added to the reaction vessel over 3 hours to cause polymerization reaction. Warming was started 60 minutes after the finish of the dropwise addition, and the temperature was raised up to 115° C. The temperature was kept at 115° C. for 1 hour, and then was cooled down to room temperature. Thereby, a resin solution was obtained. Table 2 shows the analysis results.

EXAMPLE 3

Except that the dropping vessel A was charged with AMA-M (60.0 parts) and MMA (140.0 parts), a resin solution and a white powdery resin were obtained in the same manner as in Example 1. Table 2 shows the analysis results.

EXAMPLE 4

A reaction vessel was prepared which was a three-neck separable flask provided with a thermometer, a condenser, a gas inlet tube, and a stirring apparatus. The air inside the reaction vessel was replaced by nitrogen. Under nitrogen stream, PGMEA (120.1 parts) was charged into the reaction vessel, and was heated up to 90° C. Separately, a dropping vessel A was charged with a stirred mixture of AMA-M (30.0 parts), MMA (70.0 parts), and PBO (6.0 parts); and a dropping vessel B was charged with a stirred mixture of 3-mercapto propionic acid (MPA, 0.1 parts) and PGMEA (29.9 parts).

After the internal temperature of the reaction vessel became stable, dropwise addition of the mixtures in the dropping vessels A and B were started at the same time. While the internal temperature was controlled at 90° C., the respective mixtures were dropwise added from the dropping vessel A over 90 minutes and from the dropping vessel B over 150 minutes to cause polymerization reaction. Warming was started 30 minutes after the finish of the dropwise addition from the dropping vessel A, and the temperature was raised up to 115° C. The temperature was kept at 115° C. for 1 hour, and then was cooled down to room temperature. Thereby, a resin solution was obtained. Table 2 shows the analysis results.

EXAMPLE 5

A reaction vessel was prepared which was a three-neck separable flask provided with a thermometer, a condenser, a gas inlet tube, and a stirring apparatus. The air inside the reaction vessel was replaced by nitrogen. Under nitrogen stream, PGMEA (150.0 parts) was charged into the reaction vessel, and was heated up to 90° C. Separately, a dropping vessel was charged with a stirred mixture of AMA-M (30.0 parts), MMA (70.0 parts), and PBO (6.0 parts).

After the internal temperature of the reaction vessel became stable, dropwise addition of the mixture in the dropping vessel was started. While the internal temperature was controlled at 90° C., the mixture was dropwise added to the reaction vessel over 90 minutes to cause polymerization reaction. Warming was started 30 minutes after the finish of the dropwise addition, and the temperature was raised up to 115°

C. The temperature was kept at 115° C. for 1 hour, and then was cooled down to room temperature. Thereby, a resin solution was obtained. Table 2 shows the analysis results.

EXAMPLE 6

A reaction vessel was prepared which was a four-neck separable flask provided with a thermometer, a condenser, a gas inlet tube, and a stirring apparatus. The air inside the reaction vessel was replaced by nitrogen. Under nitrogen stream, PGMEA (223.7 parts) was charged into the reaction vessel, and was heated up to 90° C. Separately, a dropping vessel A was charged with a stirred mixture of AMA-M (180.0 parts) obtained in Synthesis Example 1 and methacrylic acid (MAA, 20.0 parts); a dropping vessel B was charged with a stirred mixture of PBO (4.7 parts) and PGMEA (37.3 parts); and a dropping vessel C was charged with a stirred mixture of MPA (3.0 parts) and PGMEA (39.0 parts).

After the internal temperature of the reaction vessel became stable, dropwise addition of the mixtures in the dropping vessels A, B, and C was started at the same time. While the internal temperature was controlled at 90° C., the respective mixtures were dropwise added to the reaction vessel from the dropping vessel A over 3 hours, and from the dropping vessels B and C over 3.5 hours, to cause polymerization reaction. Warming was started 30 minutes after the finish of the dropwise addition, and the temperature was raised up to 115° C. The temperature was kept at 115° C. for 1 hour, and then was cooled down to room temperature. Thereby, a resin solution was obtained. Further, a white powdery resin was obtained by the reprecipitation. Table 2 shows the analysis results.

EXAMPLE 7

Except that the mixed solution charged into the dropping vessel A was changed to a well-stirred mixture of AMA-M (120.0 parts), benzyl methacrylate (BZMA, 50.0 parts), NMA (1.4 parts), and MAA (28.6 parts), a resin solution and a white powdery resin were obtained in the same manner as in Example 6. Table 2 shows the analysis results.

EXAMPLE 8

Except that the mixed solution charged into the dropping vessel A was changed to a well-stirred mixture of AMA-M (60.0 parts), BZMA (110.0 parts), MMA (1.4 parts), and MAA (28.6 parts), a resin solution and a white powdery resin were obtained in the same manner as in Example 6. Table 2 shows the analysis results.

Further, $^1$H-NMR was measured using the obtained powdery resin. FIG. 1 shows the $^1$H-NMR chart.

EXAMPLE 9

Except that the mixed solution charged into the dropping vessel A was changed to a well-stirred mixture of AMA-M (20.0 parts), BZMA (110.0 parts), MMA (41.4 parts), and MAA (28.6 parts), a resin solution was obtained in the same manner as in Example 6. Table 2 shows the analysis results.

EXAMPLES 10 TO 13

Except that the kind of the AMA-R, which is a monomer for introducing an ether ring structure, charged into the dropping vessel A was changed as shown in Table 2, a resin solution was obtained in the same manner as in Example 8. Table 2 shows the analysis results.

EXAMPLE 14

Except that the mixed solution charged into the dropping vessel A was changed to a well-stirred mixture of AMA-M (60.0 parts), cyclohexyl methacrylate (CHMA, 110.0 parts), MMA (1.4 parts), and MAA (28.6 parts), a resin solution was obtained in the same manner as in Example 6. Table 2 shows the analysis results.

EXAMPLE 15

A reaction vessel was prepared which was a four-neck separable flask provided with a thermometer, a condenser, a gas inlet tube, and a stirring apparatus. The air inside the reaction vessel was replaced by nitrogen. Under nitrogen stream, PGMEA (208 parts) was charged into the reaction vessel, and was heated up to 90° C. Separately, a dropping vessel A was charged with styrene (ST, 96.8 parts); a dropping vessel B was charged with a well-stirred mixture of AMA-M (60.0 parts), MMA (1.4 parts), MAA (28.6 parts), and PBO (5.0 parts); and a dropping vessel C was charged with a well-stirred mixture of MPA (3.0 parts) and PGMEA (92.0 parts).

After the internal temperature of the reaction vessel became stable, ST (13.2 parts) was charged into the reaction vessel. Immediately thereafter, dropwise addition of the mixtures in the dropping vessels A, B, and C was started at the same time. While the internal temperature was controlled at 90° C., the respective mixtures were added to the reaction vessel from the dropping vessel A over 8 hours, and from the dropping vessels B and C over 10 hours, to cause polymerization reaction. Warming was started 1 hour after the finish of the dropwise addition, and the temperature was raised up to 115° C. The temperature was kept at 115° C. for 1 hour, and then was cooled down to room temperature. Thereby, a resin solution was obtained. Further, a white powdery resin was obtained by the reprecipitation. Table 2 shows the analysis results.

EXAMPLE 16

A reaction vessel was prepared which was a four-neck separable flask provided with a thermometer, a condenser, a gas inlet tube, and a stirring apparatus. The air inside the reaction vessel was replaced by nitrogen. Under nitrogen stream, PGMEA (150.0 parts) and 2-propanol (IPA, 14.0 parts) were charged into the reaction vessel, and were heated up to 90° C. Separately, a dropping vessel A was charged with a stirred mixture of AMA-M (48.0 parts), BZMA (64.0 parts), and MAA (48.0 parts); a dropping vessel B was charged with a stirred mixture of PBO (3.7 parts) and PGMEA (38.3 parts); and a dropping vessel C was charged with a stirred mixture of MPA (4.3 parts) and PGMEA (37.7 parts).

After the internal temperature of the reaction vessel became stable, dropwise addition of the mixtures in the dropping vessels A, B, and C was started at the same time. While the internal temperature was controlled at 90° C., the respective mixtures were dropwise added to the reaction vessel from the dropping vessel A over 3 hours, and from the dropping vessels B and C over 3.5 hours, to cause polymerization reaction. Warming was started 30 minutes after the finish of the dropwise addition, and the temperature was heated up to 115° C. The temperature was kept at 115° C. for 1 hour, and then cooled down to room temperature.

The gas introduced was changed from nitrogen to nitrogen/oxygen mixed gas (oxygen 7%), and 6-t-butyl-2,4-xylenol (TBXL, 0.06 parts), glycidyl methacrylate (GMA, 52.8 parts), and dimethylbenzylamine (DMBA, 0.6 parts) were charged into the reaction vessel in this order. Then, stirring and warming were started. While the internal temperature was controlled to 110° C., the reaction of introducing a double bond into a side chain proceeded. After the temperature was kept at 110° C. for 8 hours, heating was temporarily stopped. PGMEA (80.0 parts) was added, and the pressure inside the system was gradually reduced to 37.3 kPa. Heating was restarted while this pressure was kept, and a solvent containing IPA was distilled off and simultaneously PGMEA in the same amount as that of the distilled solvent was added to the reaction vessel. Thereby, the amount of the IPA contained in the solvent in the reaction vessel was reduced. After the internal temperature reached 115° C., cooling was started, and then the pressure in the system was released to normal pressure. As a result, the distillation of the solvent and simultaneously the addition of PGMEA were stopped. The temperature was continued to be cooled down to room temperature, and thereby a resin solution was obtained. Table 2 shows the analysis results.

Figure 2:
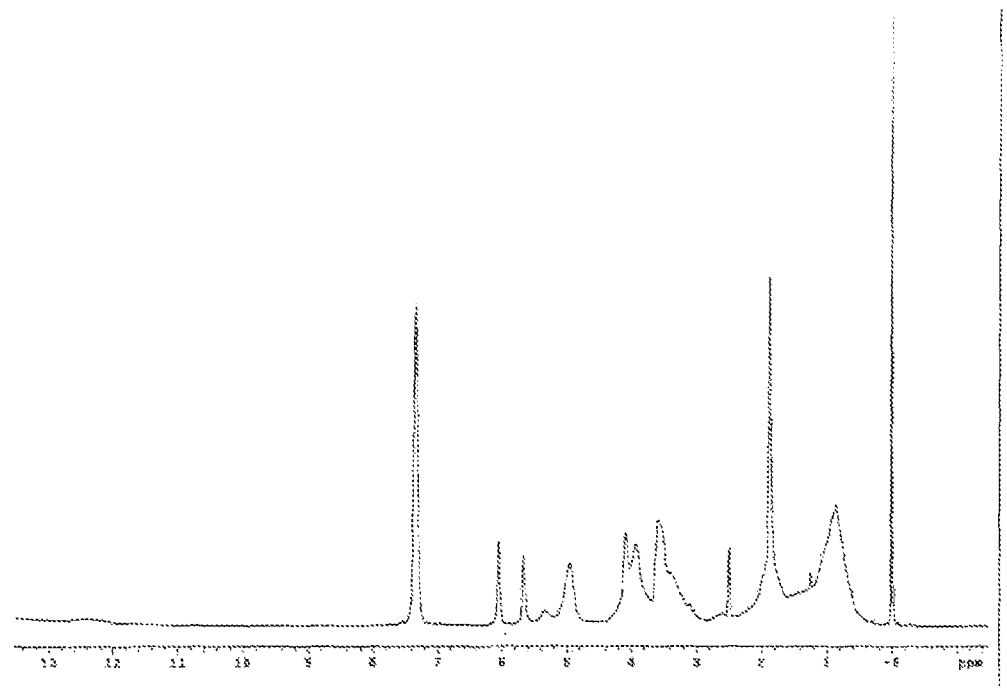
[FIG. 2]

Further, $^1$H-NMR was measured using the white powdery resin obtained by the reprecipitation: FIG. 2 shows the $^1$H-NMR chart.

EXAMPLE 17

Except that the dropping vessel A was charged with a stirred mixture of AMA-M (48.0 parts), CHMA (64.0 parts), and MAA (48.0 parts), a resin solution was obtained in the same manner as in Example 16. Table 2 shows the analysis results.

EXAMPLE 18

A reaction vessel was prepared which was a four-neck separable flask provided with a thermometer, a condenser, a gas inlet tube, and a stirring apparatus. The air inside the reaction vessel was replaced by nitrogen. Under nitrogen stream, PGMEA (140.3 parts) and IPA (14.0 parts) were charged into the reaction vessel, and were heated up to 90° C. Separately, a dropping vessel A was charged with ST (56.3 parts); a dropping vessel B was charged with a well-stirred mixture of AMA-M (48.0 parts), MAA (48.0 parts), and PBO (4.0 parts); and a dropping vessel C was charged with a well-stirred mixture of MPA (4.3 parts) and PGMEA (95.7 parts).

After the internal temperature of the reaction vessel became stable, ST (7.7 parts) was charged into the reaction vessel. Immediately thereafter, dropwise addition of the mixtures in the dropping vessels A, B, and C was started at the same time. While the internal temperature was controlled at 90° C., the respective mixtures were dropwise added to the reaction vessel from the dropping vessel A over 8 hours, and from the dropping vessels B and C over 10 hours, to cause polymerization reaction. Warming was started 1 hour after the finish of the dropwise addition, and the temperature was raised up to 115° C. The temperature was kept at 115° C. for 1 hour, and then cooled down to room temperature.

The gas introduced was changed from nitrogen to nitrogen/oxygen mixed gas (oxygen 7%), and TBXL (0.06 parts), GMA (52.8 parts), and DMBA (0.6 parts) were charged into the reaction vessel in this order. Then, stirring and Warming was started. While the internal temperature was controlled to 110° C., the reaction of introducing a double bond into a side chain proceeded. After the temperature was kept at 110° C. for 8 hours, heating was temporarily stopped. PGMEA (80.0 parts) was added, and the pressure inside the system was gradually reduced to 37.3 kPa. Heating was restarted while this pressure was kept, and a solvent containing IPA was distilled off and simultaneously PGMEA in the same amount as that of the distilled solvent was added to the reaction vessel. Thereby, the amount of the IPA contained in the solvent in the reaction vessel was reduced. After the internal temperature reached 115° C., cooling was started, and then the pressure in the system was released to normal pressure. As a result, the distillation of the solvent and simultaneously the addition of PGMEA were stopped. The temperature was continued to be cooled down to room temperature, and thereby a resin solution was obtained. Table 2 shows the analysis results.

REFERENCE EXAMPLE 1

Except that the dropping vessel A was charged with AMA-M (200.0 parts), a resin solution and a white powdery resin were obtained in the same manner as in Example 1. Table 2 shows the analysis results. Here, the polymerization concentration was 40% by mass.

Figure 3:
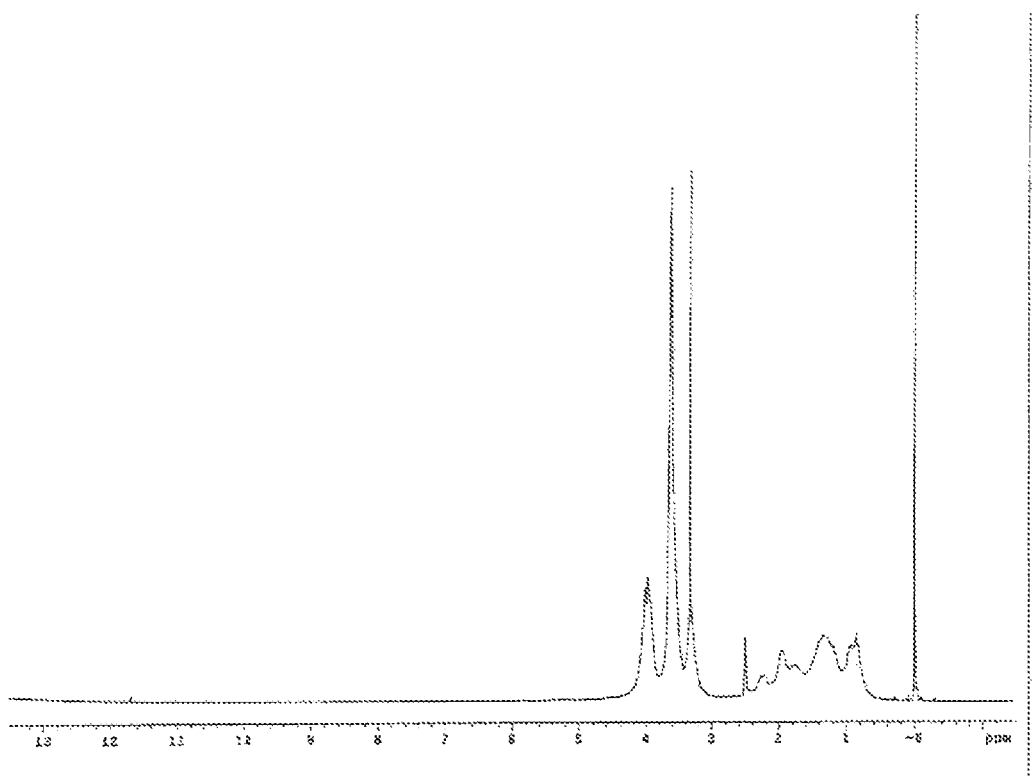
[FIG. 3]

Further, $^1$H-NMR was measured using the obtained powdery resin. FIG. 3 shows the $^1$H-NMR chart.

REFERENCE EXAMPLE 2

A reaction vessel was prepared which was a three-neck separable flask provided with a thermometer, a condenser, a gas inlet tube, and a stirring apparatus. The air inside the reaction vessel was replaced by nitrogen. Under nitrogen stream, PGMEA (170.5 parts) was charged into the reaction vessel, and was heated up to 90° C. Separately, a dropping vessel A was charged with a stirred mixture of AMA-M (50.0 parts) and PBC (1.0 part); and a dropping vessel. B was charged with a stirred mixture of MPM (0.45 parts) and PGMEA (29.6 parts).

After the internal temperature of the reaction vessel became stable, dropwise addition of the mixtures in the dropping vessels A and B was started at the same time. While the internal temperature was controlled to 90° C., the respective mixtures were dropwise added to the reaction vessel from the dropping vessel A over 90 minutes and from the dropping vessel B over 150 minutes to cause polymerization reaction. Warming was started 30 minutes after the finish of the dropwise addition from the dropping vessel A, and the temperature was raised up to 115° C. The temperature was kept at 115° C. for 1 hour, and then was cooled down to room temperature. Thereby, a resin solution was obtained. Table 2 shows the analysis results. Here, the polymerization concentration was 20% by mass.

TABLE 2

| | A-M | A-CH | A-IB | A-BZ | A-PE | MMA | BZMA | CHMA | ST | MAA | PBO |
|---|---|---|---|---|---|---|---|---|---|---|---|
| Example 1 | 60.9 | — | — | — | — | 39.1 | — | — | — | — | 2.35 |
| Example 2 | 60.9 | — | — | — | — | 39 | — | — | — | — | 6.0 |
| Example 3 | 30 | — | — | — | — | 70 | — | — | — | — | 2.35 |
| Example 4 | 30 | — | — | — | — | 70 | — | — | — | — | 6.0 |
| Example 5 | 30 | — | — | — | — | 70 | — | — | — | — | 6.0 |
| Example 6 | 90 | — | — | — | — | — | — | — | — | 10 | 2.35 |
| Example 7 | 60 | — | — | — | — | 0.7 | 25 | — | — | 14.3 | 2.35 |
| Example 8 | 30 | — | — | — | — | 0.7 | 55 | — | — | 14.3 | 2.35 |
| Example 9 | 10 | — | — | — | — | 21 | 55 | — | — | 14.3 | 2.35 |
| Example 10 | — | 30 | — | — | — | 0.7 | 55 | — | — | 14.3 | 2.35 |
| Example 11 | — | — | 30 | — | — | 0.7 | 55 | — | — | 14.3 | 2.35 |
| Example 12 | — | — | — | 30 | — | 0.7 | 55 | — | — | 14.3 | 2.35 |
| Example 13 | — | — | — | — | 30 | 0.7 | 55 | — | — | 14.3 | 2.35 |
| Example 14 | 30 | — | — | — | — | 0.7 | — | 55 | — | 14.3 | 2.35 |
| Example 15 | 30 | — | — | — | — | 0.7 | — | — | 55 | 14.3 | 2.5 |
| Example 16 | 30 | — | — | — | — | — | 40 | — | — | 30 | 2.3 |
| Example 17 | 30 | — | — | — | — | — | — | 40 | — | 30 | 2.3 |
| Example 18 | 30 | — | — | — | — | — | — | — | 40 | 30 | 2.5 |
| Reference Example 1 | 100 | — | — | — | — | — | — | — | — | — | 2.35 |
| Reference Example 2 | 100 | — | — | — | — | — | — | — | — | — | 2.00 |

| | MPM | MPA | GMA | Mw | Mn | Mw/Mn | Average number of functional groups | 5% Weight reduction temperature [° C.] | Resin acidity [mgKOH/g] | Solids content [%] |
|---|---|---|---|---|---|---|---|---|---|---|
| Example 1 | 1.75 | — | — | 14800 | 5000 | 3.0 | 19.5 | 322.3 | — | — |
| Example 2 | — | — | — | 25800 | 6300 | 4.1 | — | 297.8 | — | — |
| Example 3 | 1.75 | — | — | 13100 | 5200 | 2.5 | 10.0 | 308.4 | — | — |
| Example 4 | — | 0.1 | — | 23600 | 8700 | 2.7 | — | 266.6 | — | — |
| Example 5 | — | — | — | 22000 | 7200 | 3.1 | — | 261.1 | — | — |
| Example 6 | — | 1.5 | — | 14900 | 5000 | 3.0 | 28.8 | 328.5 | 71 | 40.6 |
| Example 7 | — | 1.5 | — | 14500 | 5200 | 2.8 | 20.0 | 321.7 | 99 | 40.5 |
| Example 8 | — | 1.5 | — | 13100 | 5700 | 2.3 | 11.0 | 297.8 | 100 | 40.6 |
| Example 9 | — | 1.5 | — | 12200 | 5800 | 2.1 | 3.7 | 287.5 | 100 | 40.3 |
| Example 10 | — | 1.5 | — | 12600 | 5400 | 2.3 | 7.2 | — | 98 | 40.9 |
| Example 11 | — | 1.5 | — | 12400 | 5400 | 2.3 | 5.8 | — | 99 | 40.8 |
| Example 12 | — | 1.5 | — | 13000 | 5800 | 2.3 | 7.2 | — | 99 | 41.0 |
| Example 13 | — | 1.5 | — | 13500 | 5900 | 2.3 | 6.8 | — | 100 | 41.1 |
| Example 14 | — | 1.5 | — | 13400 | 5800 | 2.3 | 11.2. | — | 98 | 40.7 |
| Example 15 | — | 1.5 | — | 12900 | 5600 | 2.3 | 10.8 | 319.3 | 101 | 40.5 |
| Example 16 | — | 2.7 | 33 | 13300 | 5200 | 2.6 | 10.0 | — | 64 | 39.8 |
| Example 17 | — | 2.7 | 33 | 12900 | 5100 | 2.5 | 9.8 | — | 65 | 39.5 |
| Example 18 | — | 2.7 | 33 | 13700 | 5300 | 2.6 | 10.2 | — | 63 | 40.0 |
| Reference Example 1 | 1.75 | — | — | 15300 | 5100 | 3.0 | 32.7 | 330.3 | — | — |
| Reference Example 2 | 0.9 | — | — | 10200 | 4000 | 2.6 | — | 345.8 | — | — |

The abbreviations in Table 2 mean as follows.
A-M: methyl α-allyloxymethylacrylate
A-CH: cyclohexyl α-allyloxymethylacrylate
A-IB: isobornyl α-allyloxymethylacrylate
A-BZ: benzyl α-allyloxymethylacrylate
A-PE: phenoxyethyl α-allyloxymethylacrylate
MMA: methyl methacrylate
BMA: benzyl methacrylate
CHMA: cyclohexyl methacrylate
ST: styrene
MAA: methacrylic acid
PBO: t-butylperoxy-2-ethyl hexanoate
MPM: methyl 3-mercaptopropionate
MPA: 3-mercapto propionic acid
GMA: glycidyl methacrylate
Mw: weight average molecular weight
Mn: number average molecular weight
Mw/Mn: molecular weight distribution In Table 2, the values of the monomer components each represent the ratio (% by mass) in the monomer composition; the values of the initiator, chain transfer agent, and GMA each represent the mass ratio thereof to the sum of the monomer amounts used in polymerization.

COMPARATIVE EXAMPLE 1

Except that the dropping vessel A was charged with tetrahydrofurfuryl methacrylate (THFM, 200.0 parts), a resin solution and a white powdery resin were obtained in the same manner as in Example 1. Table 3 shows the analysis results.

COMPARATIVE EXAMPLE 2

Except that the dropping vessel A was charged with MMA (200.0 parts), a resin solution and a white powdery resin were obtained in the same manner as in Example 1. Table 3 shows the analysis results.

COMPARATIVE EXAMPLE 3

Except that the amount of PGMEA charged into the reaction vessel was changed to 163.7 parts and the mixed solution charged into the dropping vessel A was changed to a well-stirred mixture of dimethyl-2,2-[oxybis(methylene)]bis-2-propenoate (MD, 60.0 parts), BZMA (110.0 parts), MMA (1.4 parts), MAA (28.6 parts), and PGMEA (60.0 parts), a resin solution and a white powdery resin were obtained in the same manner as in Example 6. Table 3 shows the analysis results.

Here, MD is a monomer which provides a resin having a tetrahydropyran ring in its main chain disclosed in Non-Patent Document 1 and Patent Document 1.

COMPARATIVE EXAMPLE 4

A reaction vessel was prepared which was a four-neck separable flask provided with a thermometer, a condenser, a gas inlet tube, and a stirring apparatus. The air inside the reaction vessel was replaced by nitrogen. Under nitrogen stream, PGMEA (111.8 parts) and IPA (111.8 parts) were charged into the reaction vessel. They were heated so that IPA was refluxed and the internal temperature reached 89° C. Separately, a dropping vessel A was charged with a well-stirred mixture of MD (20.0 parts), BZMA (110.0 parts), MMA (41.4 parts), and MAA (28.6 parts); a dropping vessel B was charged with a stirred mixture of PBO (4.7 parts), PGMEA (18.6 parts), and IPA (18.6 parts); and a dropping vessel C was charged with a stirred mixture of MPA (3.0 parts), PGMEA (19.5 parts), and IPA (19.5 parts).

After the internal temperature of the reaction vessel and the reflux state became stable, dropwise addition of the mixtures in the dropping vessels A, B, and C was started at the same time. The respective mixtures were dropwise added to the reaction vessel from the dropping vessel A over 3 hours, and from the dropping vessels B and C over 3.5 hours, to cause polymerization reaction. Warming was started 30 minutes after the finish of the dropwise addition. A solvent containing IPA was distilled off and simultaneously PGMEA in the same amount as that of the distilled solvent was added to the reaction vessel. After the internal temperature reached 115° C., heating was tentatively stopped and the pressure in the system was gradually reduced to 37.3 kPa, and this pressure was kept. Heating was restarted after the pressure in the system reached 37.3 kPa, and the internal temperature which had decreased due to the pressure reduction was again raised up to 115° C. Then, the pressure in the system was released to normal pressure to stop distillation of the solvent and addition of PGMEA. The temperature was further cooled down to room temperature, and thereby a resin solution was obtained. Table 3 shows the analysis results.

COMPARATIVE EXAMPLE 5

Except that the mixed solution charged into the dropping vessel A was changed to a well-stirred mixture of benzyl maleimide (BZMI, 60.0 parts), BZMA (110.0 parts), MMA (1.4 parts), MAA (28.6 parts), and PGMEA (60.0 parts), a resin solution and a white powdery resin were obtained in the same manner as in Example 6. Table 3 shows the analysis results.

Here, BZMI is a monomer which provides a resin having an imide ring structure in its main chain, which is known as a resin having high heat resistance disclosed in Patent Document 2.

SYNTHESIS EXAMPLE 6

Except that the mixed solution charged into the dropping vessel A was changed to a stirred mixture of BZMA (110.0 parts), MMA (61.4 parts), and MAA (28.6 parts), a resin solution and a white powdery resin were obtained in the same manner as in Example 6. Table 3 shows the analysis results.

SYNTHESIS EXAMPLE 7

Except that MMA (48.0 parts) was used instead of AMA-M (48.0 parts), a resin solution was obtained in the same manner as in Example 16. Table 3 shows the analysis results.

TABLE 3

| | MD | BZMI | THFM | MMA | BZMA | MAA | PBO | MPM | MPA | GMA | Mw | Mn | Mw/Mn | 5% Weight reduction temperature [° C.] | Resin acidity [mgKOH/g] | Solids content [%] |
|---|---|---|---|---|---|---|---|---|---|---|---|---|---|---|---|---|
| Comparative Example 1 | — | — | 100 | — | — | — | 2.35 | 1.75 | — | — | 14100 | 6400 | 2.2 | 231.6 | — | — |
| Comparative Example 2 | — | — | — | 100 | — | — | 2.35 | 1.75 | — | — | 12800 | 5700 | 2.2 | — | — | — |
| Comparative Example 3 | 30 | — | — | 0.7 | 55 | 14.3 | 2.35 | — | 1.5 | — | 79900 | 8000 | 10 | 295.2 | 101 | 40.5 |
| Comparative Example 4 | 10 | — | — | 20.7 | 55 | 14.3 | 2.35 | — | 1.5 | — | 13200 | 5500 | 2.4 | — | 101 | 40.3 |
| Comparative Example 5 | — | 30 | — | 0.7 | 55 | 14.3 | 2.35 | — | 1.5 | — | 11000 | 5000 | 2.2 | 301.9 | 103 | 39.7 |
| Synthesis Example 6 | — | — | — | 30.7 | 55 | 14.3 | 2.35 | — | 1.5 | — | 12900 | 6000 | 2.2 | 265.7 | 99 | 40.4 |
| Synthesis Example 7 | — | — | — | 30 | 40 | 30 | 2.3 | — | 2.7 | 33 | 12600 | 5700 | 2.2 | — | 64 | 39.4 |

The abbreviations in Table 3 mean as follows, in addition to those in Table 2.
MD: dimethyl-2,2'-[oxybis(methylene)]bis-2-propenoate
BZMI: benzyl maleimide
THEM: tetrahydrofurfuryl methacrylate
In Table 3, the values of the monomer components each represent the ratio (% by mass) in the monomer composition; the values of the initiator, chain transfer agent, and GMA each represent the mass ratio to the total amount of the monomers used in polymerization.
(Effect on Thermal-Decomposition Resistance of the Binder Resin of the Present Invention)
Examples 1 to 9 and 15, Reference Examples 1 and 2, and Comparative Example 1 show that the binder resin of the present invention has greatly higher thermal-decomposition resistance than a binder resin having a tetrahydrofurfuryl group in its side chain. Comparison of Example 8 with Comparative Example 3 and Comparative Example 5 shows that its level is as high as that of the thermal-decomposition resistance of a known heat-resistant resin (Comparative Example 3: a resin having a tetrahydropyran ring in its main chain, Comparative Example 5: a resin having an imide ring in its main chain).

(Increase in Heat Resistance Owing to Branching Inhibition)

Comparison between Example 1 and Example 2 and comparison of Examples 3, 4, and 8 with Example 5 show that use of a chain transfer agent prevents branching, so that the heat resistance increases.

EVALUATION EXAMPLE 1

Evaluation as Binder Resin for Radical Curable Resin Composition

EXAMPLES 19 AND 20, REFERENCE EXAMPLE 3, AND COMPARATIVE EXAMPLES 6 AND 7

<Evaluation of Effect of Reducing Polymerization Inhibition Due to Oxygen (Surface Curability)>

The surface curability upon photoradical curing was used as an indicator for evaluating the effect of reducing polymerization inhibition due to oxygen. In order to clearly evaluate the effect on the surface curability of the structural unit represented by formula (1), the evaluation was performed under the conditions that polymerization inhibition due to oxygen easily occurs (e.g. radical polymerizable monomers, photoradical polymerization initiator, blending ratio, and film thickness).

(Evaluation Method)

The powdery binder resin shown in Table 4 (1.2 parts), trimethylolpropane triacrylate (TMPTA, 2.8 parts), 2-hydroxy-2-methyl-1-phenyl-propan-1-on (DAROCURE 1173, Ciba Specialty Chemicals, 0.2 parts), and isopropyl acetate (IPAC, 6.0 parts) were stir-mixed to form a uniform solution. This solution was applied onto a float glass using a bar coater. The solution was air-dried for 10 minutes at room temperature, and then dried for 5 minutes at 70° C. using a hot-air drier. Thereby, a photoradical curable film having a thickness of 10 μm was obtained. This film was irradiated with UV using an ultra-high-pressure mercury lamp which is capable of applying a predetermined amount of light, and the tack was checked by finger touch. UV irradiation and finger touch was repeated, and the accumulated UV irradiation dose [J/cm$^2$] when the surface showed no tack was recorded. A lower accumulated UV irradiation dose indicates better surface curability. Table 4 shows the results.

<Evaluation of Adhesiveness>

Adhesiveness is one of the film characteristics after curing to which the binder resin greatly contributes. In order to clearly evaluate the effect on the adhesiveness of the structural unit represented by formula (1), the evaluation was performed only with a binder resin. The resin structure was such that no acid group such as a carboxyl group and no strong base such as amine were included.

The resins having an acid group in Examples 6 to 18 were also good in adhesiveness.

(Evaluation Method)

The powdery binder resin shown in Table 4 was dissolved in IPAC to provide a 39% solution. This solution was applied onto a float glass using a bar coater. The solution was air-dried for 10 minutes at room temperature, and then dried for 5 minutes at 70° C. using a hot-air drier. Thereby, a binder resin film having a thickness of 10 μm was obtained. The adhesiveness of the film was evaluated on a 6-grade scale, from 0 to 5, according to JIS K 5600-5-6 (Cross-cut test). Table 4 shows the results. Table 5 shows the standard for classification of adhesiveness in Table 4.

TABLE 4

|  | Powdery binder resin | UV irradiation dose [J/cm$^2$] | Classification of adhesiveness |
| --- | --- | --- | --- |
| Example 19 | Example 1 | 2.4 | 1 |
| Example 20 | Example 3 | 3.2 | 1 to 2 |
| Reference Example 3 | Reference Example 1 | 2.3 | 0 |
| Comparative Example 6 | Comparative Example 1 | 2.3 | 1 |
| Comparative Example 7 | Comparative Example 2 | 4.5 | 3 |

TABLE 5

| | |
| --- | --- |
| 0 | Perfectly smooth cut edge, no peeling observed at every cross portions |
| 1 | Little peeling of film at intersections of cut lines<br>Less than 5% of cross-cut portions clearly affected |
| 2 | Film peeled off along cut edge and/or at intersections<br>More than 5% and less than 15% of cross-cut portions clearly affected |
| 3 | Film greatly peeled off along cut edge partially or on the whole, and/or peeled at multiple portions of spots partially or on the whole<br>More than 15% and less than 35% of cross-cut portions clearly affected |
| 4 | Film greatly peeled off along cut edge partially or on the whole, and/or peeled at multiple spots partially or on the whole<br>More than 35% and less than 65% of cross-cut portions clearly affected |
| 5 | Degree of peeling worse than the classification 4 |

(Effects on Surface Curability and Adhesiveness of the Binder Resin of the Present Invention)

Examples 19 and 20, Reference Example 3, and Comparative Example 7 show that the structural unit represented by formula (1) improved surface curability and adhesiveness. Comparative Example 6 shows that the effect on the surface curability was equal to that of the resin having a tetrahydrofurfuryl group in its side chain, and the effect on the adhesiveness was higher than that of the resin having a tetrahydrofurfuryl group in its side chain.

EXAMPLES 21 TO 24, REFERENCE EXAMPLE 4, AND COMPARATIVE EXAMPLES 8 AND 9

<Evaluation of Transparency>

The powdery binder resin shown in Table 6 was dissolved in PGMEA to prepare a 30% solution. The transmittance [%] at a wavelength of 400 nm of this solution was measured using a spectrophotometer (UV-3100, Shimadzu Corp.). This transmittance was treated as the transmittance before heating. Separately, the powdery binder resin was put into a glass vessel and heated for 1.5 hours at 230° C., and then dissolved in PGMEA to prepare a 30% solution. The transmittance (%) at a wavelength of 400 nm was measured, and this was treated as the transmittance after heating. Further, the transmittance retention (%) was calculated by the following formula based on the transmittances before and after heating. Table 6 shows the results.

Transmittance retention [%]=transmittance after heating/transmittance before heating×100

TABLE 6

| | Powdery binder resin | Transparency | | |
|---|---|---|---|---|
| | | Transmittance before heating [%] | Transmittance after heating [%] | Transmittance retention [%] |
| Example 21 | Example 1 | 97.4 | 77.5 | 79.6 |
| Example 22 | Example 3 | 98.1 | 83.3 | 84.9 |
| Example 23 | Example 8 | 97.2 | 75.9 | 78.0 |
| Example 24 | Example 9 | 98.3 | 87.6 | 89.1 |
| Reference Example 4 | Reference Example 1 | 94.5 | 54.4 | 57.5 |
| Comparative Example 8 | Comparative Example 1 | 92.8 | 30.0 | 32.4 |
| Comparative Example 9 | Comparative Example 5 | 83.6 | 41.6 | 49.8 |

(Effect on Transparency of the Binder Resin of the Present Invention)

Examples 21 to 24, Reference Example 4, and Comparative Examples 8 and 9 show that the binder resin of the present invention had higher transparency than the binder resin having a tetrahydrofurfuryl group in its side chain and a resin having an imide ring in its main chain.

EVALUATION EXAMPLE 2

Evaluation as Binder Resin for Colorant-Dispersed Composition

<Preparation of Colorant-Dispersed Solution (Mill Base) and Evaluation of Dispersion Stability>

In general, the effect of the binder resin on dispersion stability in the color resist is evaluated using a colorant-dispersed solution (mill base) containing no curable components in order to clearly evaluate the effect of the binder resin. Thus, a mill base was prepared and the dispersion stability of the mill base was evaluated.

EXAMPLES 25 TO 32

(Preparation of Mill Base)

First, a 20% solution of SOLSPERSE 24000GR (The Lubrizol Corp., hereinafter referred to as SP24000) dissolved in PGMEA was prepared as a dispersant solution, and a 20% solution of a resin solution shown in Table 7 diluted by PGMEA was prepared as a binder resin solution.

Then, C.I. pigment green 36 (Monastral Green 6Y—CL: Heubach, hereinafter referred to as PG36, 3.75 parts) and C.I. pigment yellow 150 (Yellow Pigment E4GN-GT: Lanxess, hereinafter referred to as PY150, 2.5 parts) as colorants, and SOLSPERSE 12000 (The Lubrizol Corp., hereinafter referred to as SP12000, 0.2 parts) as a dispersant, were put into a 225-ml mayonnaise bottle. Further, the pre-prepared 20% dispersant solution (3.75 parts) and the above 20% binder resin solution (14.0 parts), PGMEA (25.8 parts), and 1.0-mm-diameter zirconia beads (50 parts) were put into the 225-ml mayonnaise bottle, and a lid was put thereon. The bottle was shaken for 3 hours by a paint shaker so that the components were dispersed, and then the mill base and the zirconia beads were separated. Thereby, the mill base was obtained.

(Check of Dispersion State)

The median size of the mill base immediately after the dispersion was measured using a dynamic light scattering-type particle size distribution measurement apparatus (LB-500, HORIBA, Ltd.). A median size of 100 nm or smaller was evaluated as "+", while a median size of greater than 100 nm was evaluated as "−". Table 7 shows the results.

(Evaluation of Dispersion Stability)

The mill base showing a good dispersion state immediately after the dispersion (having a median size of 100 nm or smaller) was stored in a constant-temperature room (23° C.). The viscosity thereof was measured 1 day, 2 weeks, and 4 weeks after the dispersion using a cone-plate rotational viscometer (TVE 22LT, Toki Sangyo Co., Ltd.). Further, an increasing rate of the viscosity was calculated by the following formula. Table 7 shows the results.

Increasing rate of viscosity [%]=viscosity after 2 weeks (or 4 weeks)/viscosity after 1 day×100−100.

EXAMPLE 33

Except that the kinds and amounts of the components of the mill base charged into the mayonnaise bottle were changed as follows, a mill base was prepared and the dispersion stability was evaluated as in Example 25. Table 7 shows the results.

C.I. pigment blue 1.5:6 (Heliogen Blue L6700F: BASF, hereinafter referred to as PB15:6): 5.0 parts C.I. pigment violet 23 (Hostaperm Violet RL-NF, Clariant, hereinafter referred to as PV23): 1.25 parts 20% Solution of SP24000 in PGMEA: 3.75 parts SP12000: 0.2 parts 20% resin solution obtained in Example 8 diluted by PGMEA: 14.0 parts PGMEA: 25.8 parts

EXAMPLE 34

Except that the kinds and amounts of the components of the mill base charged into the mayonnaise bottle were changed as follows, a mill base was prepared and the dispersion stability was evaluated as in Example 25. Table 7 shows the results.

C.I. pigment red 254 (Irgaphor. Red BT-CF, Ciba Specialty Chemicals, hereinafter referred to as PR254): 4.4 parts C.I. pigment red 177 (Cromophtal Red A3B, Ciba Specialty Chemicals, hereinafter referred to as PR177): 1.85 parts 20% Solution of SP24000 in PGMEA: 5.0 parts 20% resin solution obtained in Example 8 diluted by PGMEA: 13.75 parts PGMEA: 25.0 parts

EXAMPLE 35

Except that the kinds and amounts of the components Of the mill base charged into the mayonnaise bottle were changed as follows, a mill base was prepared and the dispersion stability was evaluated as in Example 25. Table 7 shows the results.

Carbon black (MA220, Mitsubishi Chemical Corp., hereinafter, referred to as CB): 6.25 parts 20% Solution of SP24000 in PGMEA: 3.75 parts SF12000: 0.2 parts 20% resin solution obtained in Example 8 diluted by PGMEA: 14.0 parts PGMEA: 25.8 parts

COMPARATIVE EXAMPLES 10 TO 12

Except that the resin solution was changed as shown in Table 7, a mill base was prepared and the dispersion stability was evaluated as in Example 25. Table 7 shows the results.

TABLE 7

| | Binder resin solution | State of dispersion | Viscosity [MPa·s] 1 Day | 2 Weeks | 4 Weeks | Increasing rate of viscosity [%] 2 Weeks | 4 Weeks |
|---|---|---|---|---|---|---|---|
| Example 25 | Example 8 | + | 4.29 | 4.63 | 4.71 | 8 | 10 |
| Example 26 | Example 9 | + | 4.20 | 4.71 | 4.87 | 12 | 16 |
| Example 27 | Example 10 | + | 4.36 | 4.72 | 4.93 | 9 | 13 |
| Example 28 | Example 11 | + | 4.55 | 4.99 | 5.11 | 10 | 12 |
| Example 29 | Example 12 | + | 4.21 | 4.49 | 4.60 | 7 | 9 |
| Example 30 | Example 13 | + | 4.25 | 4.51 | 4.61 | 6 | 8 |
| Example 31 | Example 14 | + | 4.43 | 4.81 | 4.94 | 9 | 12 |
| Example 32 | Example 15 | + | 4.77 | 5.22 | 5.33 | 9 | 12 |
| Example 33 | Example 8 | + | 4.11 | 4.33 | 4.41 | 5 | 7 |
| Example 34 | Example 8 | + | 4.88 | 5.21 | 5.30 | 7 | 9 |
| Example 35 | Example 8 | + | 4.46 | 4.90 | 5.05 | 10 | 13 |
| Comparative Example 10 | Comparative Example 3 | — | — | — | — | — | — |
| Comparative Example 11 | Comparative Example 4 | + | 4.27 | 5.01 | 5.21 | 17 | 22 |
| Comparative Example 12 | Comparative Example 6 | + | 4.32 | 5.46 | 5.75 | 26 | 33 |

(Effect on Dispersion Stability of the Alkali-Soluble Resin of the Present Invention)

Examples 25 and 26 and Comparative Example 12 show that the structural unit represented by formula (1) provides higher dispersion stability than a common binder resin. Further, Examples 25 and 26 and Comparative Examples 10 and 11 show that this effect is better achieved by the present invention than by the resin having a tetrahydropyran ring in its main chain disclosed in Non-Patent Document 1 and Patent Document 1. Poor dispersion in Comparative Example 10 was presumably caused by an abnormally high molecular weight of the binder resin (Comparative Example 3). In addition, Examples 27 to 32 show that the present invention is excellent in dispersion stability even though other copolymer components were changed or R in the structural unit represented by formula (1) was changed.

EVALUATION EXAMPLE 3

Evaluation as Binder Resin for Photosensitive Resin Composition

<Evaluation of Image-Forming Properties>

As mentioned below, the photosensitive colored resin composition (color resist) was prepared and the image-forming properties were evaluated using the color resist.

The development residue and the pattern shape were used as indicators for evaluating the image-forming properties.

EXAMPLE 36

(Preparation of Color Resist)

First, substances for a mill base shown in Table 8 were subjected to dispersion using a bead mill with 0.3-mm zirconia beads charged therein to prepare a green mill base. Next, substances for a transparent resist solution shown in Table 8 were stir-mixed to prepare a transparent resist solution. Then, the green mill base (240.0 parts) and the transparent resist solution (135.0 parts) thus obtained were stir-mixed, and the mixture was filtered using a 1-μm filter. Thereby, a green resist was obtained.

(Evaluation of Development Residue and Pattern Shape)

The green-colored composition was applied onto a 100 mm×100 mm-square glass substrate with a chrome black matrix formed thereon using a spin coater at an adjusted number of rotation so as to provide a dried film thickness of 1.5 μm. The composition was prebaked for 2 minutes at 90° C., and then exposed to light at 100 mJ/cm² using a proximity-type exposure apparatus and a pattern mask having 10 μl-width lines and spaces. Thereafter, the composition was developed by 0.1% sodium carbonate aqueous solution using a spray developing apparatus. The developing time was such a time that gave the most preferable developability within 10 to 100 seconds. The composition was then washed with water and air-dried. The obtained green glass substrate with a pattern was observed using a laser microscope, and thereby the development residue and the pattern shape were evaluated according to the following criteria. Table 9 shows the results.

(1) Development residue
++: No residue in space portion
+: Very thin and small residue in part of space portion
±: Thin residue in space portion
−: Thick residue in space portion (2) Pattern Shape
++: Straight and sharp line edge
+: Fuzzy line edge in some portions
±: Fuzzy line edge on the whole
−: Clearly collapsed line edge

EXAMPLES 37 TO 42 AND COMPARATIVE EXAMPLES 13 TO 15

Except that the binder resin for mill bases and the binder resin for transparent resist solutions were changed as shown in Table 9, the evaluation was performed in the same manner as in Example 36. Table 9 shows the results.

TABLE 8

| | Classification | Substance | Parts by weight |
|---|---|---|---|
| Mill base | Cobrant | PG36 | 22.5 |
| | | PY150 | 15.0 |
| | Dispersant | 20% Solution of SP24000 in PGMEA | 24.0 |
| | | SP12000 | 1.2 |
| | Binder resin | 20% Resin solution of Example 8 diluted by PGMEA | 82.5 |
| | Solvent | PGMEA | 154.8 |
| Transparent resin solution | Poly-functional monomer | Dipentaerythritolhexaacrylate | 16.5 |

TABLE 8-continued

| Classification | Substance | Parts by weight |
|---|---|---|
| Binder resin | 20% Resin solution of Example 8 diluted by PGMEA | 41.3 |
| Photo initiator series | 2-Mercaptobenzothiazol | 3.0 |
| | Methylp-dimethylaminobenzoate | 3.0 |
| | 4,4'-Bis(dimethylamino)benzophenon | 3.0 |
| Solvent | PGMEA | 102 |

TABLE 9

| | Binder resin for mill base | Binder resin for transparent resist solution | In age-forming properties | |
|---|---|---|---|---|
| | | | Development residue | Pattern shape |
| Example 36 | Example 8 | Example 8 | ++ | + |
| Example 37 | Example 8 | Example 16 | ++ | ++ |
| Example 38 | Example 8 | Example 17 | ++ | ++ |
| Example 39 | Example 8 | Example 18 | ++ | ++ |
| Example 40 | Example 8 | Synthesis Example 7 | + | + |
| Example 41 | Example 16 | Example 16 | ++ | ++ |
| Example 42 | Synthesis Example 6 | Example 16 | ± to + | + |
| Comparative Example 13 | Synthesis Example 6 | Synthesis Example 6 | ± | − |
| Comparative Example 14 | Synthesis Example 6 | Synthesis Example 7 | ± | ± |
| Comparative Example 15 | Synthesis Example 7 | Synthesis Example 7 | − | − |

(Effect on Image-Forming Properties of the Alkali-Soluble Resin of the Present Invention)

The examples show that use of the alkali-soluble resin of the present invention as a binder resin increases the image-forming properties. In other words, color filters can be produced in good yield if segments of the color filters are formed using the photosensitive colored resin composition of the present invention.

<Preparation of Color Filter and Liquid Crystal Display Panel>

EXAMPLE 43

(Preparation of Color Resist)

The photosensitive colored resin composition of Example 41 was used as a green resist.

Except that the kind and the amount of the colorant were changed as shown in Table 10, red, blue, and black resists were obtained in the same manner as in Example 41.

TABLE 10

| Type of resist | Cobrant | |
|---|---|---|
| | Type | Parts by weight |
| Green resist | PG36 | 22.5 |
| | PY150 | 15.0 |
| Red resist | PR254 | 26.3 |
| | PR177 | 11.2 |
| Blue resist | PB156 | 30.0 |
| | PV23 | 7.5 |
| Black resist | CB | .37.5 |

(Preparation of Transparent Resist for Photo Spacers and Protecting Films)

Substances mentioned below were stir-mixed, and the mixture was filtered through a 1-μm filter. Thereby, a transparent resist for photo spacers and protecting films were obtained.

20% resin solution obtained in Example 16 diluted by PGMEA: 100.0 parts
Dipentaerythritol hexaacrylate: 20.0 parts
IRGACURE 907 (Ciba Specialty Chemicals): 2.4 parts
IRGACURE 369 (Ciba Specialty Chemicals): 0.4 parts
PGMEA: 10.0 parts (Preparation of Color Filter and Liquid Crystal Display Panel)

The black resist was applied onto a 230 mm×300 mm-square alkali-free glass substrate having a thickness of 1.1 mm by a spin coating method to form a film, and the film was prebaked (80° C., 5 minutes). Then, the film was subjected to alignment exposure at a light amount of 500 mJ/cm$^2$ using a proximity-type exposure apparatus which has an ultra-high-pressure mercury lamp as a light source through a predetermined photo mask for black matrices. The film was developed using an alkaline developing solution, washed with pure water, and then postbaked (230° C., 30 minutes). Thereby, a black matrix (thickness: 1.2 μm) was formed.

The red resist was applied onto the substrate with the black matrix formed thereon by a spin coating method to form a film, and the film was prebaked (80° C., 5 minutes). Then, the film was subjected to alignment exposure at a light amount of 100 mJ/cm$^2$ using a proximity-type exposure apparatus which has an ultra-high-pressure mercury lamp as a light source through a predetermined photo mask for pixels. The film was developed using an alkaline developing solution, washed with pure water, and then postbaked (220° C., 30 minutes). Thereby, a red pixel pattern (thickness: 2.0 μm) was formed. In the same manner, a green pixel pattern and a blue pixel pattern were formed from the green resist and the blue resist, respectively.

Check of the formed black matrix and pixel patterns by a laser microscope found no pattern failure and no development residue, and clarified that the surface flatness of the pixels was good.

The transparent resist for photo spacers and protecting films was applied onto the substrate with the black matrix and the respective color pixels formed thereon by a spin coating method to form a film, and the film was prebaked (80° C., 5 minutes). Then, the film was subjected to alignment exposure at a light amount of 100 mJ/cm$^2$ using a proximity-type exposure apparatus which has an ultra-high-pressure mercury lamp as a light source through a predetermined photo mask for protecting films. The film was developed using an alkaline developing solution, washed with pure water, and then postbaked (220° C., 30 minutes). Thereby, a protecting film (thickness: 1.5 μm) was formed.

A transparent conductive layer (thickness: 0.15 μm) comprising indium tin oxide was formed on the color filter with the protecting film formed thereon by a sputtering method. The transparent resist for photo spacers and protecting films was applied onto the substrate with the protecting film formed thereon by a spin coating method to form a film, and the film was prebaked (80° C., 5 minutes). Then, the film was subjected to alignment exposure at a light amount of 100 mJ/cm$^2$ using a proximity-type exposure apparatus which has an ultra-high-Pressure mercury lamp as a light source through a predetermined photo mask for spacers. The film was developed using an alkaline developing solution, washed with pure water, and then postbaked (220° C., 30 minutes). Thereby, a photo spacer (height: 4.8 μm, base: 12 μm×12 μm square) was formed.

Check of the formed color filter by a laser microscope found no spacer pattern failure or development residue.

A polyimide alignment layer was formed on the color filter formed above and subjected to alignment treatment (rubbing), and was attached to a TFT array substrate using an epoxy resin-based sealant. A TN-type liquid crystal was charged into between the color filter and the TFT array substrate from an injection port formed on the sealed portion, and then the injection port was sealed. Further, optical films such as a polarizer were attached. Thereby, a simple TN liquid crystal display device was obtained.

The obtained liquid crystal display device was high in brightness and color purity, did not suffer color unevenness, and showed good display quality.

INDUSTRIAL APPLICABILITY

The radical curable resin composition of the present invention is excellent not only in curability in the air (oxygen-trapping ability) but also in adhesiveness and transparency, and very excellent in heat resistance. It can be used for a wide variety of applications such as adhesives, pressure-sensitive adhesives, biomaterials, dental materials, optical components, information storage materials, optical fiber materials, color-filter resists, solder resists, plating resists, insulators, sealants, inkjet inks, printing inks, paints, casting materials, decorative laminates, WPCs, covering materials, photosensitive resin plates, dry films, lining materials, civil engineering and construction materials, putty, reinforcing materials, floor materials, paving materials gel coatings, over-coatings, molding materials for techniques such as hand lay-up, spray up, pultrusion molding, filament winding, SMC, and BMC, and polymer solid electrolytes.

The colorant-dispersed composition of the present invention can achieve dispersibility and other characteristics such as adhesiveness, heat resistance, surface curability, and transparency together at high levels. In particular, the composition is suitably used for high performance inks and paints, and they can be used for automobiles, coated steel panels, building materials, cans, photogravure printers, flexo printers, ink-jet printers, and color filters, for example.

The alkali-soluble resin of the present invention and the photosensitive resin composition comprising this resin of the present invention are very excellent in heat resistance. They are suitably used for resists for forming components in the electronic information field, such as solder resists, etching resists, for interlayer insulating materials, plating resists, and resists for color filters. They are also excellent in colorant dispersibility and image-forming properties, and thus they are particularly suitably used for forming colored layers of color filters.

The invention claimed is:

1. An α-allyloxymethylacrylic copolymer, comprising in its main chain
a structural unit represented by formula (1):

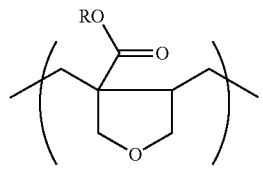

wherein R is a hydrogen atom or a C1-C30 organic group, and an other structural unit, and the structural unit represented by formula (1) is derived from an α-allyloxymethylacrylic monomer represented by formula (2):

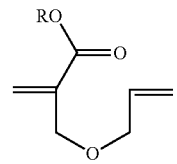

wherein R is a hydrogen atom or a C1-C30 organic group and the other structural unit being derived from a radical polymerizable monomer other than the α-allyloxymethylacrylic monomer (2) and which is copolymerizable with the a-allyloxymethylacrylic monomer.

2. The α-allyloxymethylacrylic copolymer according to claim 1, which is obtained by a production method comprising radical polymerizing monomer components including a monomer represented by formula (2):

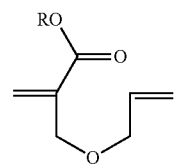

wherein R is a hydrogen atom or a C1-C30 organic group.

3. A resin composition, comprising
the α-allyloxymethylacrylic copolymer according to claim 1,
wherein the resin composition is intended to be used for at least one application selected from the group consisting of applications requiring photosensitivity, applications requiring colorant dispersibility, and applications requiring radical curability.

4. A method for producing an α-allyloxymethylacrylic copolymer comprising in its main chain a structural unit represented by formula (1):

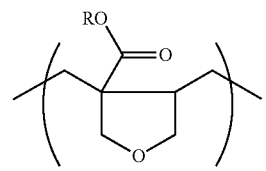

wherein R is a hydrogen atom or a C1-C30 organic group,
the method comprising
polymerizing monomer components including an α-allyloxymethylacrylic monomer represented by formula (2):

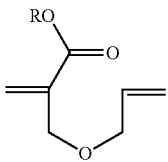 (2)

wherein R is a hydrogen atom or a C1-C30 organic group.

5. The method for producing an α-allyloxymethylacrylic copolymer according to claim 4,
wherein the polymerizing comprises radical polymerization in the presence of a chain transfer agent in a polymerization solvent.

6. The method for producing an α-allyloxymethylacrylic copolymer according to claim 5,
wherein the chain transfer agent is a mercapto group-containing compound.

7. A resin composition, comprising the α-allyloxymethylacrylic copolymer according to claim 2,
wherein the resin composition is intended to be used for at least one application selected from the group consisting of applications requiring photosensitivity, applications requiring colorant dispersibility, and applications requiring radical curability.

8. The a-allyloxymethylacrylic copolymer according to claim 1, which is formed by polymerization of monomer components comprising the α-allyloxymethylacrylic monomer and other radical polymerizable monomer, and the amount of the α-allyloxymethylacrylic monomer is 1 to 99 mol % in all of the monomer components.

9. The α-allyloxymethylacrylic copolymer according to claim 1, wherein the number of the structural units represented by formula (1) per main chain of the α-allyloxymethylacrylic copolymer is 0.5 or more.

10. The α-allyloxymethylacrylic copolymer according to claim 1, which has a polydispersity (the weight average molecular weight / the number average molecular weight) of 5.0 or lower.

11. The α-allyloxymethylacrylic copolymer according to claim 1, wherein the acidity of the α-allyloxymethylacrylic copolymer is 10 to 300 mgKOH/g.

12. The α-allyloxymethylacrylic copolymer according to claim 2, wherein the α-allyloxymethylacrylic copolymer is obtained by using 0.03% by mass or more of a chain transfer agent including mercapto group-containing compound in 100% by mass of the monomer components.

* * * * *

UNITED STATES PATENT AND TRADEMARK OFFICE
CERTIFICATE OF CORRECTION

PATENT NO. : 8,497,332 B2
APPLICATION NO. : 13/142142
DATED : July 30, 2013
INVENTOR(S) : Tomomasa Kaneko It is certified that error appears in the above-identified patent and that said Letters Patent is hereby corrected as shown below:

Delete the title page and substitute therefore the attached title page showing the corrected number of claims in patent.

Title Page, item (54), and in the specification, column 1, lines 1-3, amend the title as follows:

--ALPHA-ALLYLOXYMETHYLACRYLIC ACID-BASED COPOLYMER, RESIN ~~COMPOSITIONS~~ COMPOSITION, AND USE THEREOF--.

In the Claims:

Claim 1, at column 57, amend line number 67, as follows:

--and an other structural unit <u>derived from at least one monomer selected from the group consisting of (meth)acrylic ester, (meth)acrylamide, unsaturated monocarboxylic acid, aromatic vinyl and N-substituted maleimide</u>,--.

Claim 1, at column 58, delete line numbers 17-20, as follows:

"~~and the other structural unit being derived from a radical polymerizable monomer other than the α-allyloxymethylacrylic monomer (2), and which is copolymerizable with the α-allyloxymethylacrylic monomer.~~".

Signed and Sealed this
Fifteenth Day of October, 2013

Teresa Stanek Rea
*Deputy Director of the United States Patent and Trademark Office*

Claim 3, at column 58, amend line number 42, as follows:

--wherein the resin composition is ~~intended to be~~ used for at--

Claim 4, at column 59, amend line number 11, as follows:

--wherein R is a hydrogen atom or a C1-C30 organic group<u>, and at least one monomer selected from the group consisting of (meth)acrylic ester, (meth)acrylamide, unsaturated monocarboxylic acid, aromatic vinyl and N-substituted maleimide</u>.--.

Claim 7, at column 59, amend line number 24, as follows:

--wherein the resin composition is ~~intended to be~~ used for at--.

Claim 11, column 60, line 17, should be deleted:

"~~11. The α-allyloxymethylacrylic copolymer according to claim 1, wherein the acidity of the α-allyloxymethylacrylic copolymer is 10 to 300 mgKOH/g.~~".

(12) United States Patent
Kaneko

(10) Patent No.: US 8,497,332 B2
(45) Date of Patent: Jul. 30, 2013

(54) α-ALLYLOXYMETHYLACRYLIC ACID-BASED COPOLYMER, RESIN COMPOSITIONS, AND USE THEREOF

(75) Inventor: Tomomasa Kaneko, Osaka (JP)

(73) Assignee: Nippon Shokubai Co., Ltd., Osaka (JP)

( * ) Notice: Subject to any disclaimer, the term of this patent is extended or adjusted under 35 U.S.C. 154(b) by 68 days.

(21) Appl. No.: 13/142,142

(22) PCT Filed: Dec. 28, 2009

(86) PCT No.: PCT/JP2009/071819
§ 371 (c)(1),
(2), (4) Date: Jun. 24, 2011

(87) PCT Pub. No.: WO2010/074289
PCT Pub. Date: Jul. 1, 2010

(65) Prior Publication Data
US 2011/0263805 A1 Oct. 27, 2011

(30) Foreign Application Priority Data

Dec. 26, 2008 (JP) .................. 2008-331731
Dec. 26, 2008 (JP) .................. 2008-331752
Dec. 26, 2008 (JP) .................. 2008-331812
Dec. 26, 2008 (JP) .................. 2008-333228
Sep. 28, 2009 (JP) .................. 2009-223280

(51) Int. Cl.
C08F 220/06 (2006.01)
C08F 220/28 (2006.01)

(52) U.S. Cl.
USPC .................. 526/224; 526/317.1; 526/320

(58) Field of Classification Search
USPC .................. 526/224, 317.1, 320
See application file for complete search history.

(56) References Cited

U.S. PATENT DOCUMENTS

2007/0212651 A1 9/2007 Huang et al.

FOREIGN PATENT DOCUMENTS

| JP | 2003-201316 A | 7/2003 |
| JP | 2005-234385 A | 9/2005 |
| JP | 2006-161035 A | 6/2006 |
| JP | 2007-316598 A | 12/2007 |

OTHER PUBLICATIONS

Thompson et al. Macromolecules 1992, 25, 6455-6459.*

(Continued)

Primary Examiner — Vu A Nguyen
(74) Attorney, Agent, or Firm — Novak Druce Connolly Bove + Quigg LLP

(57) ABSTRACT

The present invention provides: resins which can be used for various applications such as radical curable resin compositions, colorant-dispersed compositions, and photosensitive resin compositions; resin compositions; and means for producing the resins. Specifically, the present invention provides an α-allyloxymethylacrylic copolymer having in its main chain a structural unit represented by formula (1):

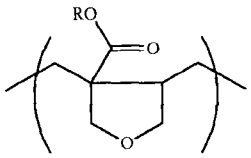

(1)

wherein R is a hydrogen atom or a C1-C30 organic group.

10 Claims, 2 Drawing Sheets

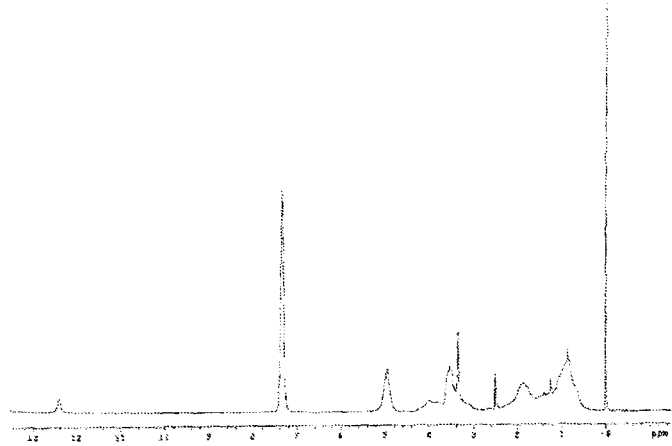

UNITED STATES PATENT AND TRADEMARK OFFICE
CERTIFICATE OF CORRECTION

PATENT NO. : 8,497,332 B2  
APPLICATION NO. : 13/142142  
DATED : July 30, 2013  
INVENTOR(S) : Tomomasa Kaneko Page 1 of 1

It is certified that error appears in the above-identified patent and that said Letters Patent is hereby corrected as shown below:

On the Title page after the Abstract, "10 Claims, 2 Drawing Sheets" should read  
-- 11 Claims, 2 Drawing Sheets --.

Signed and Sealed this  
Eleventh Day of March, 2014

Michelle K. Lee  
*Deputy Director of the United States Patent and Trademark Office*